(12) United States Patent
Shim et al.

(10) Patent No.: US 10,706,133 B2
(45) Date of Patent: Jul. 7, 2020

(54) SMART WATCH AND METHOD FOR CONTROLLING SAME

(71) Applicant: LG ELECTRONICS INC., Seoul (KR)

(72) Inventors: Hongjo Shim, Seoul (KR); Gukchan Lim, Seoul (KR); Yoonwoo Lee, Seoul (KR); Seonghyok Kim, Seoul (KR); Mihyun Park, Seoul (KR); Dongeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 15/580,489

(22) PCT Filed: Jan. 15, 2016

(86) PCT No.: PCT/KR2016/000453
§ 371 (c)(1),
(2) Date: Dec. 7, 2017

(87) PCT Pub. No.: WO2016/208835
PCT Pub. Date: Dec. 29, 2016

(65) Prior Publication Data
US 2018/0181733 A1 Jun. 28, 2018

(30) Foreign Application Priority Data

Jun. 22, 2015 (KR) .......................... 10-2015-0088425

(51) Int. Cl.
*G06F 21/00* (2013.01)
*G06F 21/32* (2013.01)
(Continued)

(52) U.S. Cl.
CPC ............. *G06F 21/32* (2013.01); *G04G 21/08* (2013.01); *G06F 3/02* (2013.01); *G06F 3/0362* (2013.01);
(Continued)

(58) Field of Classification Search
CPC ..... G06F 21/32; G04G 21/08; G06K 9/00087
See application file for complete search history.

(56) References Cited

U.S. PATENT DOCUMENTS

2007/0215558 A1* 9/2007 Niinuma ............... G06K 9/0012
210/767
2009/0059730 A1* 3/2009 Lyons ..................... G04G 21/08
368/69
(Continued)

FOREIGN PATENT DOCUMENTS

| KR | 10-2013-0022345 | 3/2013 |
|---|---|---|
| KR | 10-2014-0138361 | 12/2014 |
| KR | 10-2014-0141984 | 12/2014 |

OTHER PUBLICATIONS

International Search Report and Written Opinion dated May 18, 2016 issued in Application No. PCT/KR2016/000453 (with English translation).

*Primary Examiner* — Jeffrey C Pwu
*Assistant Examiner* — Thong P Truong
(74) *Attorney, Agent, or Firm* — Ked & Associates, LLP

(57) ABSTRACT

Disclosed are a smart watch comprising a fingerprint sensor for user authentication, and a method for controlling the same. The present invention provides a smart watch and a method for controlling the same, the smart watch comprising: a case; a display unit which is positioned on the case and is configured to display the current time and a variety of information; a bezel which is provided on the case and is configured to surround the display unit; a fingerprint sensor which is provided on the bezel and is configured to simul-
(Continued)

taneously recognize a plurality of fingerprints which are different from each other; and a control device which is configured to control the operation on the basis of the fingerprints recognized by the fingerprint sensor.

19 Claims, 31 Drawing Sheets

(51) Int. Cl.
| | |
|---|---|
| *G04G 21/08* | (2010.01) |
| *G06F 3/041* | (2006.01) |
| *G06F 3/0362* | (2013.01) |
| *G06F 3/0482* | (2013.01) |
| *G06F 3/02* | (2006.01) |
| *G06Q 20/40* | (2012.01) |
| *G06K 9/00* | (2006.01) |
| *G06F 3/0487* | (2013.01) |
| *G06F 3/0488* | (2013.01) |
| *G06F 3/0485* | (2013.01) |
| *G06F 3/0481* | (2013.01) |

(52) U.S. Cl.
CPC ............ *G06F 3/041* (2013.01); *G06F 3/0482* (2013.01); *G06F 3/0485* (2013.01); *G06F 3/0487* (2013.01); *G06F 3/0488* (2013.01); *G06K 9/00087* (2013.01); *G06K 9/00355* (2013.01); *G06Q 20/40145* (2013.01); *G06F 3/04815* (2013.01); *G06F 2203/0339* (2013.01); *G06F 2203/04808* (2013.01)

(56) References Cited

U.S. PATENT DOCUMENTS

| | | | |
|---|---|---|---|
| 2011/0205851 | A1 | 8/2011 | Harris |
| 2013/0208103 | A1* | 8/2013 | Sands ..................... G06F 21/31 |
| | | | 348/78 |
| 2015/0186705 | A1* | 7/2015 | Magi .................... G06K 9/0002 |
| | | | 382/125 |

\* cited by examiner (a)   (b)   (c)

FIG. 27
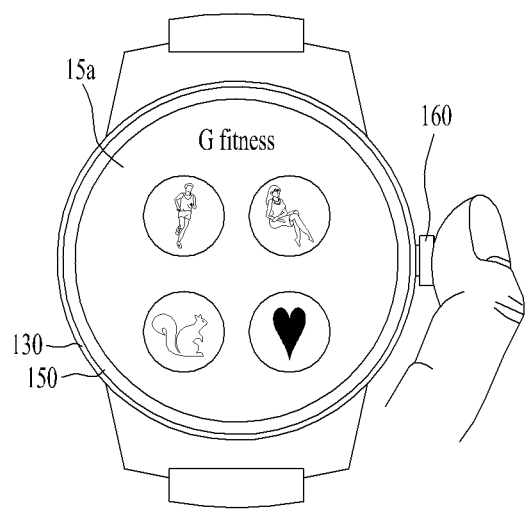
(Normal mode)
(a)
(Security mode)
(b)

FIG. 30
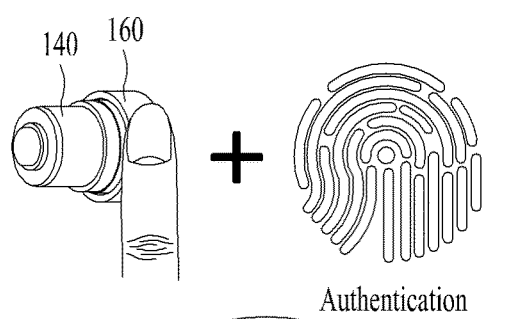
(a)
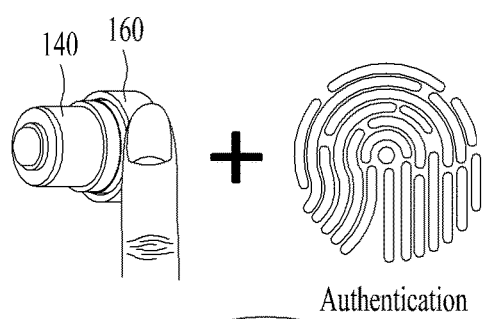
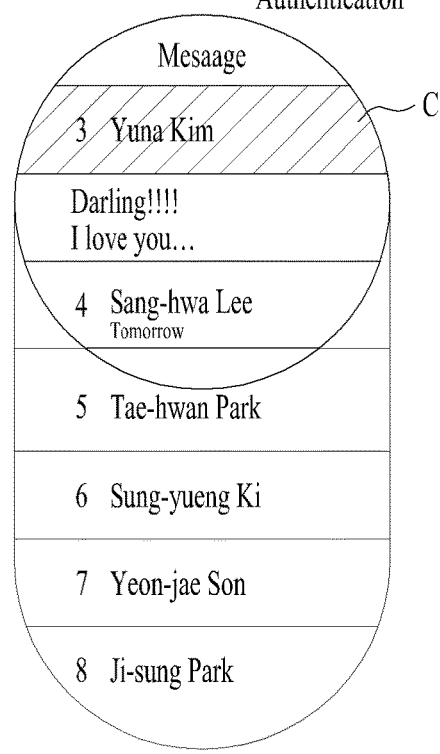
(b)

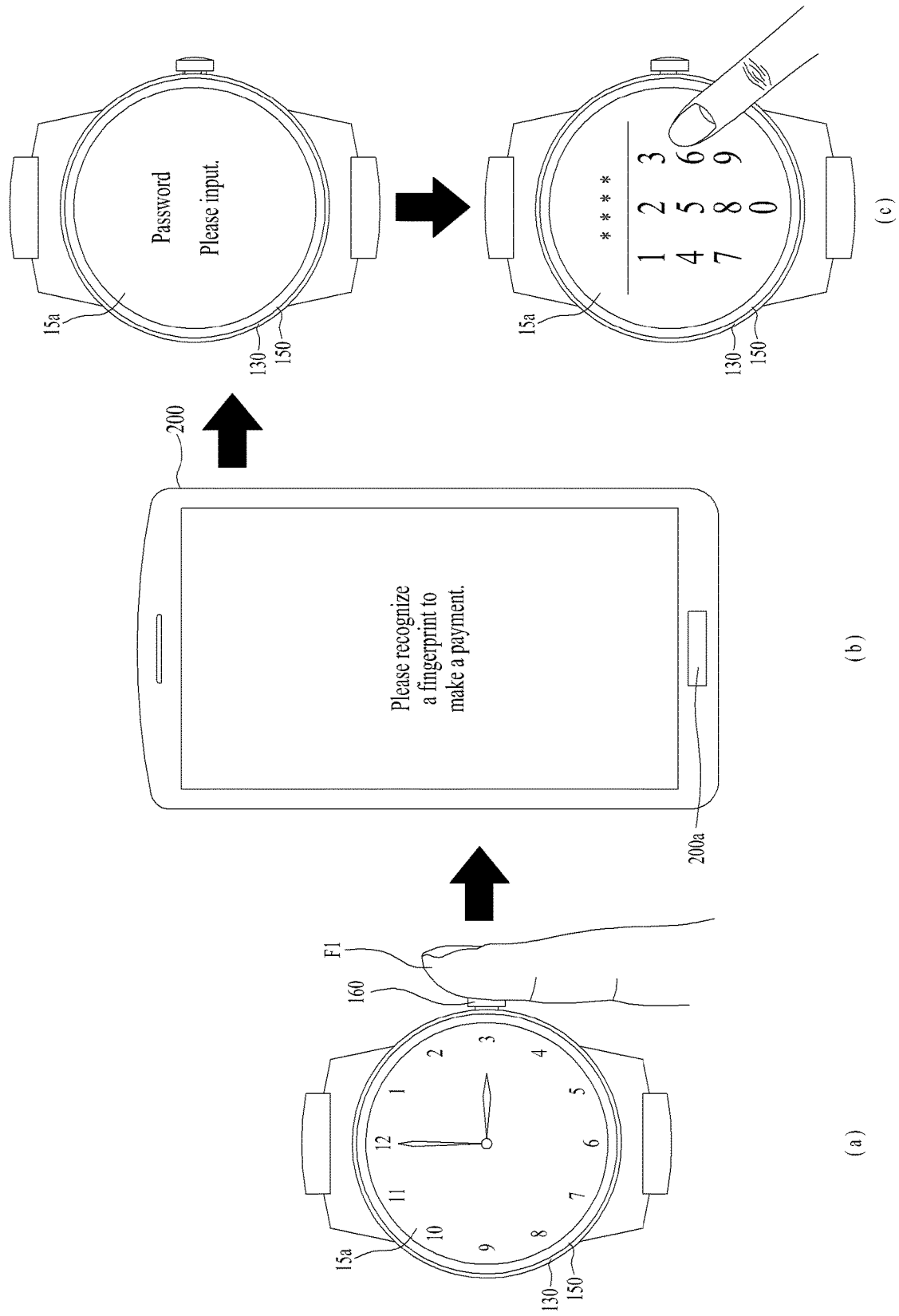

SMART WATCH AND METHOD FOR CONTROLLING SAME

CROSS-REFERENCE TO RELATED PATENT APPLICATIONS

This application is a U.S. National Stage Application under 35 U.S.C. § 371 of PCT Application No. PCT/KR2016/000453, filed Jan. 15, 2016, which claims priority to Korean Patent Application No. 10-2015-0088425, filed Jun. 22, 2015, whose entire disclosures are hereby incorporated by reference.

TECHNICAL FIELD

The present invention relates to a wearable smart device, and more particularly, to a smart watch that can be worn on a user's wrist and method for controlling the same.

BACKGROUND ART

Generally, terminals can be classified as mobile/portable terminals and stationary terminals according to their mobility. The mobile terminals can be further classified as handheld terminals and vehicle mount terminals according to possibility of user's direct portability.

The mobile terminals have become increasingly more functional. Examples of such functions include data and voice communication, image and video capturing through a camera, voice recording, music file playback through a speaker system, and image and video displaying through a display unit. Some mobile terminals include additional functions for supporting game playing and working as multimedia players. In particular, current mobile terminals can receive multicast signals including visual contents such as videos and television programs. Basically, the mobile terminal is connected to the network or other devices through various communication protocols to perform the above-described functions, and thus a ubiquitous computing environment can be provided to users. That is, the mobile terminal has been evolved as a smart device capable of providing connectivity to the network and ubiquitous computing.

Traditionally, such a smart device operating as the mobile terminal has been designed to have a size that allows a user to grab the smart device with a user's hand and thus, the user could carry around the smart device in the hand or put the smart device in a bag or pocket. In accordance with the recent development of technology, the size of the smart device has been remarkably reduced, and thus the smart device has been developed as a wearable smart device, which can be directly worn on a user's body. In particular, efforts have been made to develop and popularize a smart watch worn on a user's wrist, which is one among such wearable smart devices.

The smart watch with a size small enough to be worn on the wrist has been developed to provide not only the typical function of the watch, for example, provision of time information, but also a variety of enhanced functions of the mobile terminal. Further, in the case of a recently developed smart watch, all the above-described functions of the mobile terminal are included therein so that the mobile terminal can be replaced with the recently developed smart watch. For example, similar to the mobile terminal, the smart watch can store various personal information of the user or access the personal information stored in other devices through the network. However, the smart watch has no means of controlling access to the user's personal information, and thus, a security device for protecting the user's personal information should be developed for the smart watch. In addition, a method for protecting the personal information based on such a security device is also required.

DISCLOSURE OF THE INVENTION

Technical Task

Accordingly, an object of the present invention is to address the above-noted and other problems. In addition, another object of the present invention is to provide a smart watch with improved security functions.

A further object of the present invention is to provide a method for controlling a smart watch capable of efficiently performing improved security functions.

Technical Solutions

To achieve these objects and other advantages, in an aspect of the present invention, provided herein is a smart watch, including: a case; a display unit disposed on the case and configured to display various information including the current time; a bezel provided on the case and configured to enclose the display unit; a fingerprint sensor provided on the bezel and configured to simultaneously recognize a plurality of different fingerprints; and a control device configured to control operation based on fingerprints recognized by the fingerprint sensor.

The fingerprint sensor may be continuously formed along the bezel in the form of a rim enclosing the display unit. In addition, the fingerprint sensor may be configured to check whether an object in contact with the fingerprint sensor is a human finger by comparing a constant voltage change, which occurs when a user's finger is contacted, with a predetermined pattern. When it is determined that the object is the human finger, the fingerprint sensor may be configured to form a fingerprint image by reading a constant voltage value for the entirety of the contacted finger.

The smart watch may further include a touch sensor formed along the fingerprint sensor and configured to recognize a movement of a user's finger on the fingerprint sensor.

The control device may be configured to authenticate whether the recognized fingerprints are user's fingerprints and perform different operation according to the number of authenticated fingerprints. Specifically, the control device may be configured to give different levels of confidentiality to information in the smart watch according to the number of authenticated fingerprints. In addition, the control device may be configured to allow different ranges of information and operation for a user according to the number of authenticated fingerprints.

In another aspect of the present invention, provided herein is a control method for a smart watch including a fingerprint sensor for simultaneously recognizing a plurality of different fingerprints, including: simultaneously registering a plurality of different fingerprints; recognizing at least one fingerprint to instruct a predetermined intended operation; authenticating whether the recognized fingerprint is one of the registered fingerprints; and when the recognized fingerprint is authenticated, performing the intended operation. In the performance step, different operation may be performed according to the number of simultaneously authenticated fingerprints.

The registration and recognition steps may be installed in a bezel of the smart watch and performed by the fingerprint sensor configured to simultaneously recognize a plurality of fingerprints.

The registration step may include: simultaneously swiping at least two fingers on the fingerprint sensor installed in a bezel of the smart watch; recognizing fingerprints of the fingers through the fingerprint sensor during the swiping step; and storing the recognized fingerprints. In addition, the swiping step may include: contacting at least two fingertips of any hand with the fingerprint sensor; and rotating the fingers including the fingertips along the fingerprint sensor while touching the fingerprint sensor with the fingertips.

The recognition step may include recognizing at least two different fingerprints. In addition, the recognition step may further include: recognizing a movement of the finger when the fingerprint of the finger is recognized; and instructing the smart watch to perform a predetermined operation based on the recognized movement.

The recognition step may include recognizing a fingerprint to give confidentiality to information provided by the smart watch. The performance step may include giving different levels of confidentiality to information in the smart watch according to the number of simultaneously authenticated fingerprints. In addition, the recognition step may include recognizing a fingerprint to access information in the smart watch, and the performance step may include allowing different ranges of information and operation according to the number of simultaneously authenticated fingerprints.

Meanwhile, the control method may further include, when the smart watch is connected to an external device so that communication therebetween is enabled, allowing different ranges of operation and information at the smart watch and the external device according to whether the fingerprint is authenticated by the smart watch and the external device. In addition, the control method may further include, when the smart watch is connected to an external device so that communication therebetween is enabled, and when the fingerprint is authenticated by any one of the smart watch and the external device during the authentication step, allowing a limited range of information and operation at the smart watch and the external device for a user. Moreover, the control method may further include additionally authenticating the fingerprint through the other of the smart watch and the external device in order to allow, for the user, information and operation more extended than the information and operation allowed when the user's fingerprint is authenticated by the any one of the smart watch and the external device.

Advantageous Effects

A smart according to present invention watch may include finger sensors capable of recognizing and authenticating user's fingerprints, specifically, first and second recognition units. Although the first and second recognition units are disposed on a bezel and a crown of the smart watch, the first and second recognition units can simultaneously recognize different fingerprints. Therefore, the smart watch can provide sufficient security functions by efficiently using its structure which is limited in terms of size. Hence, a user can safely and conveniently use the smart watch according to the present invention.

In addition, a control method according to the present invention can optimally control user authentication by efficiently using structural features of the smart watch, that is, a function capable of simultaneously recognizing a plurality of fingerprints. Therefore, the control method according to the present invention can provide not only improved security functions but also user convenience.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 27 is a schematic diagram illustrating in detail steps for providing a different user interface according to whether a fingerprint is authenticated through the second recognition unit.

FIGS. 29 and 30 are schematic diagrams illustrating in detail examples of steps for providing different ranges of information and operation according to a fingerprint authenticated through the second recognition unit of the smart watch in reference to a text message.

FIGS. 34 and 35 are schematic diagrams illustrating in detail examples of steps for providing different ranges of operation and information according to whether a fingerprint is authenticated through the smart watch and an external device when the smart watch is connected to the external device.

BEST MODE FOR INVENTION

Figure 1:
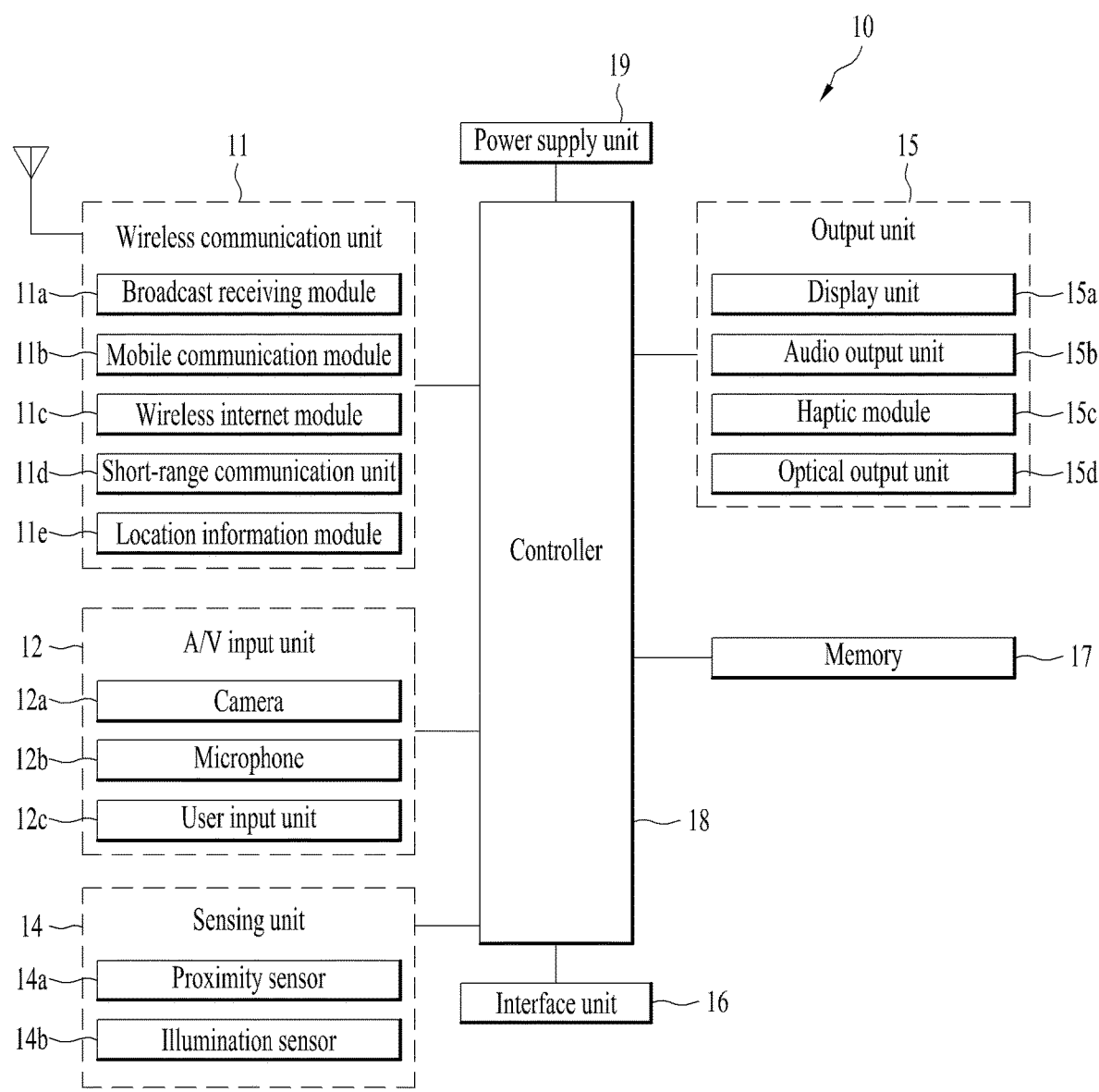
FIG. 1 is a block diagram illustrating a configuration of a smart watch described in the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first (1st), second (2nd), etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Smart devices presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of smart devices. However, such teachings apply equally to other types of smart devices, such as those types noted above.

FIG. 1 is a block diagram to describe a smart watch related to the present application. A general configuration of the smart watch is described with reference to FIG. 1 as follows.

First of all, the smart watch 100 may include components such as a wireless communication unit 11, an input unit 12, a sensing unit 14, an output unit 15, an interface unit 16, a memory 17, a controller 18, a power supply unit 19, and the like. It is appreciated that implementing all of the components shown in FIG. 1 is not a requirement, and that greater or fewer components may alternatively be implemented. Moreover, the real shapes and structures of the aforementioned components are not illustrated all but the shapes and structures of some significant components are shown in the drawings following FIG. 1. Yet, it is apparent to those skilled in the art that components described without being illustrated can be included in the smart watch to embody the functions of a smart device.

In particular, among the above-listed components, the wireless communication unit 11 typically includes one or more modules which permit communications such as wireless communications between the smart watch 100 and a wireless communication system, communications between the smart watch 100 and another smart watch, communications between the smart watch 100 and an external server. Further, the wireless communication unit 11 typically includes one or more modules which connect the smart watch 100 to one or more networks.

To facilitate such communications, the wireless communication unit 11 may include one or more of a broadcast receiving module 11a, a mobile communication module 11b, a wireless Internet module 11c, a short-range communication module 11d, and a location information module 11e.

The input unit 12 includes a camera 12a (or an image input unit) for an image or video signal input, a microphone 12b (or an audio input unit) for an audio signal input, and a user input unit 12c (e.g., a touch key, a push key, etc.) for receiving an input of information from a user. Audio or image data collected by the input unit 12c may be analyzed and processed into user's control command.

The sensing unit 14 is typically implemented using one or more sensors configured to sense internal information of the smart watch, the surrounding environment of the smart watch, user information, and the like. For example, the sensing unit 14 may include a proximity sensor 14a and an illumination sensor 14b. If desired, the sensing unit 14 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 12a), the microphone 12b, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The smart watch 100 disclosed in the present specification may be configured to utilize information obtained from the sensing unit 14, and in particular, information obtained from one or more sensors of the sensing unit 140, and combinations thereof.

The output unit 15 is typically configured to output various types of information, such as audio, video, tactile output, and the like. The output unit 15 may include a display unit 15a, an audio output unit 15b, a haptic module 15c, and an optical output module 15d. The display unit 15a may have an inter-layered structure or an integrated structure with a touch sensor in order to facilitate a touchscreen. The touchscreen may provide an output interface between the smart watch 100 and a user, as well as function as the user input unit 12c which provides an input interface between the smart watch 100 and the user.

The interface unit 16 serves as an interface with various types of external devices that can be coupled to the smart watch 100. The interface unit 16, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the smart watch 100 may perform assorted control functions associated with a connected external device, in response to the external device being connected to the interface unit 16.

The memory 17 is typically implemented to store data to support various functions or features of the smart watch 100. For instance, the memory 170 may be configured to store application programs (or applications) run in the smart watch 100, data or instructions for operations of the smart watch 100, and the like. Some of these application programs may be downloaded from an external server via wireless communication. Other application programs may be installed on the smart watch 100 at time of manufacturing or shipping, which is typically the case for basic functions of the smart watch 100 (for example, receiving a call, placing a call, receiving a message, sending a message, and the like). It is common for application programs to be stored in the memory 17, installed on the smart watch 100, and launched by the controller 18 to perform operations (or functions) for the smart watch 100.

The controller 18 typically functions to control overall operations of the smart watch 100, in addition to the operations associated with the application programs. The controller 18 may provide or process information or functions appropriate for a user by processing signals, data, information and the like, which are inputted or outputted by the various components depicted in the above description, or running application programs stored in the memory 17.

Moreover, in order to launch an application program stored in the memory 17, the controller 18 can control at least one portion of the components described with reference to FIG. 1. Furthermore, the controller 18 controls at least two of the components included in the smart watch 100 to be activated in combination to launch the application program.

The power supply unit 19 can be configured to receive external power or provide internal power in order to supply appropriate power required for operating elements and components included in the smart watch 100. The power supply unit 19 may include a battery 19a. In particular, the battery 19a may include at least one of a built-in battery or a replaceable (or detachable) battery.

At least some of the components may operate in a cooperative manner to implement operation, control, or a control method for the smart watch 100 according to various embodiments described below. In addition, the operation, control, or control method for the smart watch 100 may be implemented on the smart watch 100 through driving of at least one application program stored in the memory 17.

In the accompanying drawings, it is illustrated that the smart watch 100 has a shape similar to that of the typical watch, that is, it can be worn on a user's wrist. However, the present invention is not limited thereto, and the smart watch 100 may be implemented to have various shapes, for example, a necklace type of device. In other words, configurations of a specific type of smart watch and description thereof can be applied to other types of smart watches as well as the specific type of smart watch in general.

Figure 2:
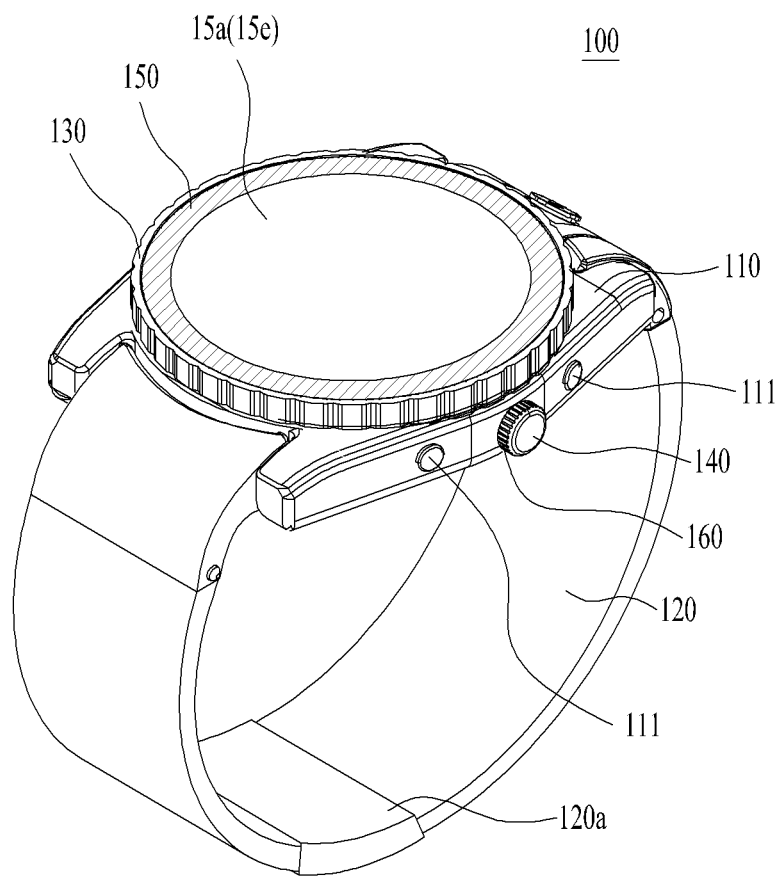
FIG. 2 is a perspective view of the smart watch.
Figure 3:
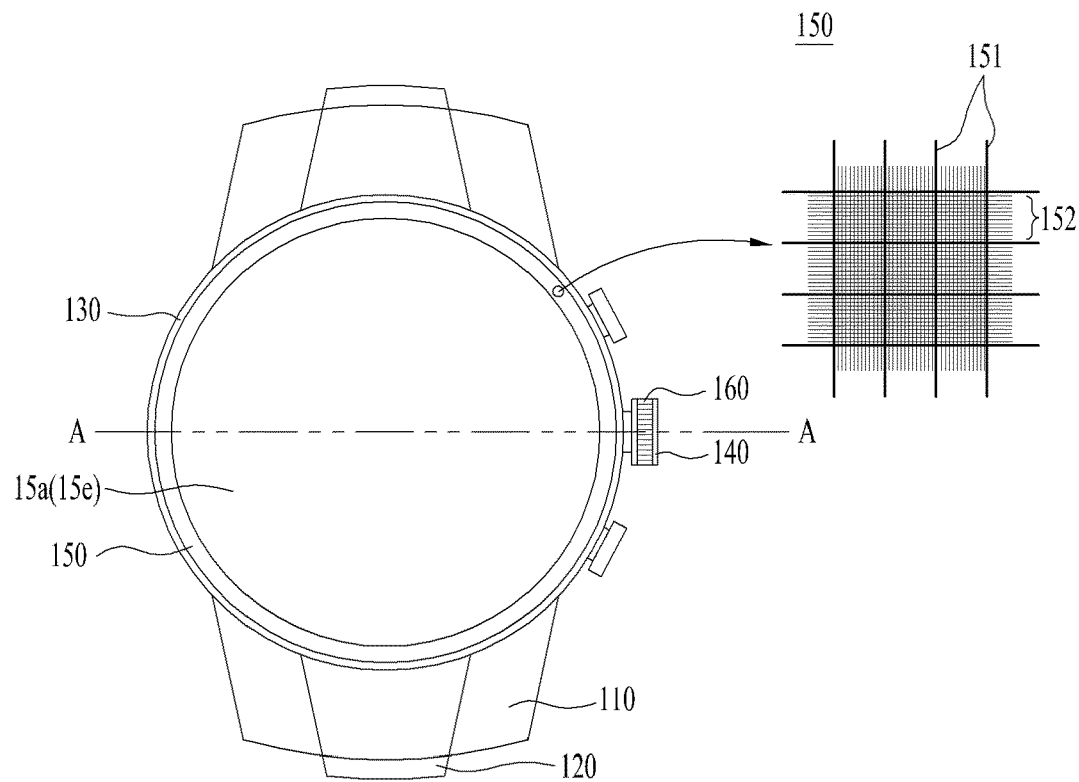
FIG. 3 is a front view illustrating the smart watch and a first recognition unit disposed on a bezel thereof.
Figure 4:
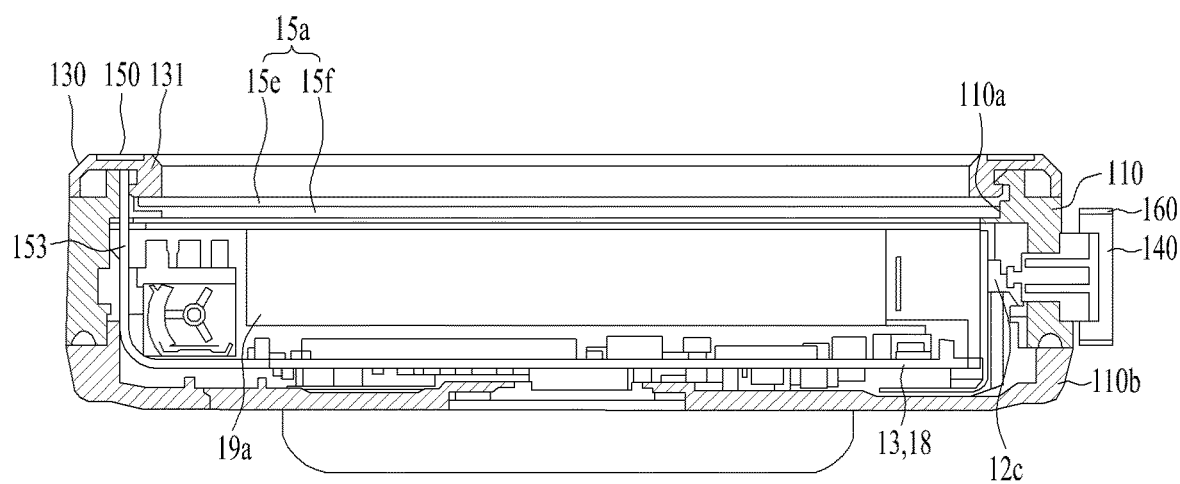
FIG. 4 is a cross-sectional view of the smart watch taken along the line A-A shown in FIG. 3.
Figure 5:
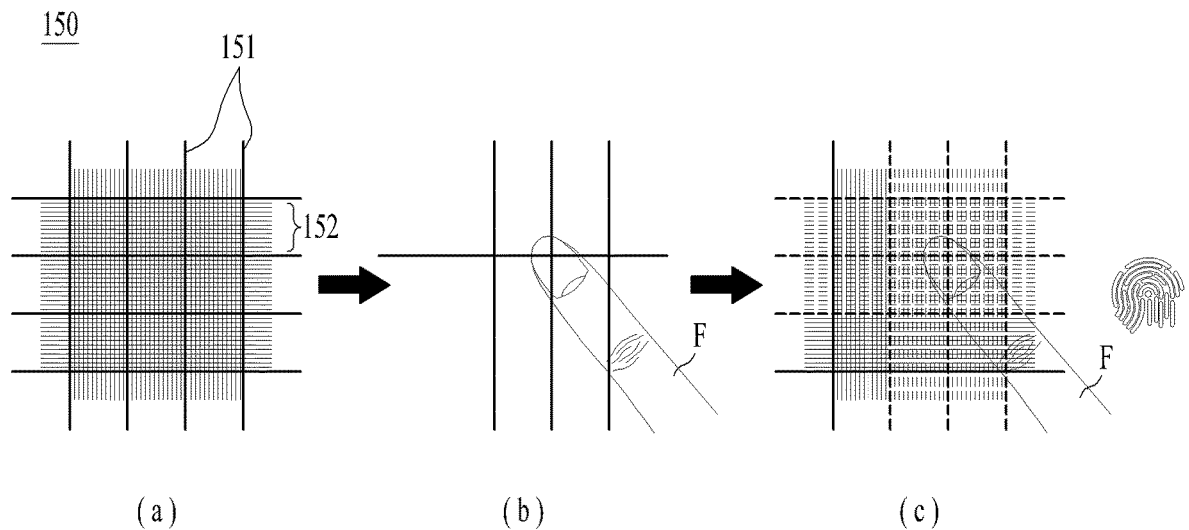
FIG. 5 is a schematic diagram illustrating a process for obtaining a user's fingerprint through a recognition unit of the smart watch and a fingerprint sensor thereof.

In addition to the above-described general configuration of the smart watch 100, the structure of the smart watch 100 will be described with reference to the related drawings. Specifically, FIG. 2 is a perspective view of the smart watch, FIG. 3 is a front view illustrating the smart watch and a first recognition unit disposed on a bezel thereof, FIG. 4 is a cross-sectional view of the smart watch taken along the line A-A shown in FIG. 3, and FIG. 5 is a schematic diagram illustrating a process for obtaining a user's fingerprint through a recognition unit of the smart watch and a fingerprint sensor thereof. Since the overall structure of the smart watch 100 is illustrated in FIG. 2, it is assumed that all descriptions are basically made with reference to FIG. 2 unless a diagram to be used as a reference is mentioned.

The smart watch 100 may include a case 110 that forms a body of the smart watch 100. Referring to FIG. 4, the case 110 may define an inner space with a prescribed size for accommodating various components. In addition, the case 110 may include an opening 110a connected to the inner space to install the components within the inner space. Generally, the case 110 may be made of a single member (or material). However, as shown in the drawing, the case may include a case back 110b to be detachably coupled, and through the detachable case back 110b, it is possible to easily access the internally accommodated components. Moreover, although the case 110 is illustrated to have a circular shape, it may have various shapes including a quadrangle.

The smart watch 100 may include a band 120 connected to the case 110. The band 120 may be configured to allow a user to wear the smart watch 100 on a wrist. The band 120 is commonly worn on the user's wrist and may be made of a flexible material for facilitating wearing. As one example, the band 120 may be made of leather, rubber, silicon, synthetic resin, or the like. The band 120 may also be configured to be detachable from the case 110. Accordingly, the band 120 may be replaceable with various types of bands according to user's preference. In some cases, the band 120 may be used for extending the antenna performance of the wireless communication unit 11 (cf. FIG. 1). For example, the band 120 may include therein a ground extension portion (not shown) electrically connected to the antenna to extend a ground area. In addition, the band 120 may include a fastener 120a. The fastener 202a may be implemented into a buckle type, a snap-fit hook structure, a Velcro® type, or the like, and include a flexible section or material. The drawing illustrates an example in which the fastener 202a is implemented using a buckle.

The smart watch 100 may include a bezel 130 disposed on the case 110. The bezel 130 may be made of a single member in the shape of a ring and formed along a boundary of the case 110. More specifically, the bezel 130 may be configured to enclose the opening 110a of the case 110. That is, the bezel 130 encloses a display unit 15a disposed in the opening 110a to protect the display unit 15a. It will be described in detail later. Moreover, the bezel 130 can hold a separate glass or crystal member configured to protect the display unit 15a. In addition to the protective purpose, the bezel 130 may be configured to provide other functions and may also be used for a decorative purpose.

The smart watch 100 may include a crown 140 disposed on the side of the case 110. Assuming a typical analog watch, the crown 140 is connected to a movement installed in the case 110 and can be rotated. That is, when the crown 140 is rotated, physical hands can be moved. Thus, in the case of the typical watch, the crown 140 is used to adjusts the hands for the purpose of correcting time error. Similarly, in the case of the smart watch 100, the crown 140 may be used to adjust virtual hands displayed on the display unit 15a for display of accurate time. Further, the crown 140 of the smart watch 100 may be used as an input unit 12c. More specifically, when the crown 140 is rotated, a prescribed control signal may be transmitted to a control unit 18, and the control unit 18 may instruct the smart watch 100 to perform a predetermined operation based on the signal. For example, by retaining the crown 140, a user may scroll a list displayed on the display unit 15a or extend or reduce a specific object. In addition, the crown 140 may be configured to push a switch connected to the circuit board 13, i.e., the input unit 12c and instruct to perform an operation according to the push input. Moreover, to extend functions of the input unit 12c, the smart watch 100 may include a push button 111. The push button 111 may be disposed close to the crown 140 on the side of the case 110 as shown in FIG. 2. For example, the push button 111 may be installed in the circuit board 13 or in contact with a switch electrically connected to the circuit board 13. Thus, when the push button 111 is pushed, a prescribed electrical signal occurs in the circuit board 13 and control unit 18, and thus the circuit board 13 and control unit 18 may instruct the corresponding electrical components to perform operations as the mobile terminal.

In aspect of functionality, the case 110 may be basically configured to support various electrical and mechanical components required for the operations of the smart watch 100. Since FIG. 3 illustrates the inner configuration of the smart watch 100 well, inner components of the smart watch 100 are described in detail with reference to this drawing as follows.

First, the smart watch 100 may include the display unit 15a as an output unit 15. The display unit 15a may be exposed from the smart watch 100 in order to be shown well to a user currently wearing the smart watch 100. The display unit 15a is basically disposed within the case 110 and may be exposed to the user through the opening 110a of the case 110. That is, the display unit 15a and the case 110 may form exterior appearance of the smart watch 100. In addition, the display unit 15a can provide the user with various information as functions of a mobile terminal or smart device. More specifically, the display unit 15a can display various information processed by the smart watch 100. For instance, the display unit 15a basically displays various images and text information and is also able to display information on an execution screen of an application executed in the smart watch 100 or a UI (user interface) or a GUI (graphic user interface) according to the execution screen information. Moreover, the display unit 15a can inform the user of the current time. In order to display the current time, the display unit 15a can directly display numbers corresponding to the current time or may display a clock face (i.e., dial or face) and hands like the analog watch. That is, the display unit 15a and other electrical components related to the display unit 15a can implement an electrical and virtual watch through the smart watch 100.

The display unit 15a may be implemented using at least one of a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 15a may include a display module 15f and a window 15e configured to cover the display module 15f. The display module 15f may be implemented as the aforementioned display device such as the LCD, OLED, or the like and is the component that actually displays image information. The window 15e may be disposed on a part of the display module 15f exposed to the user and is able to protect the display module 15f externally. That is, the window 15e may work as the glass or crystal member of the typical watch. In addition to the protective function, the window 15e should be configured to allow the information, which is displayed on the display module 15f, to be viewed by a user. Therefore, the window 15e may be formed of a material having proper strength and transparency. Referring to FIG. 4, the display module 15f can be directly attached to the backside of the window 152. In this case, as shown in the drawing, the bezel 130 may be configured to hold both of the window 15e and the display module 15f together with the case 110. To directly attach the display module 15f to the window 15e, multiple ways can be used, and as the simplest way, adhesive may be used.

To receive a control command by a touch mechanism, the display unit 15a may include a touch sensor configured to sense a touch on the display unit 15a. The touch sensor may use at least one of the following touch types: a resistive film type; a capacitance type; an infrared ray type; an ultrasonic wave type; and magnetic field type. For example, in the case of the resistive film type or the capacitance type, the touch sensor may be configured to convert a change in pressure applied to a specific part of a touch screen or a change in capacitance occurring in a specific part of the touch screen, into an electrical input signal. If a touch is applied to the display unit 15a through the touch sensor, the touch sensor senses the corresponding touch and is then able to generate a control command corresponding to the touch. Contents inputted by the touch mechanism may include texts, numerals, menu items indicated or designated in various modes, and the like.

The touch sensor may be configured in the form of a film having a touch pattern, disposed between the window 15e and the display module 15f. Alternatively, it may be implemented as a metal wire which is patterned directly on the backside of the window 15e. Further, the touch sensor may be integrally formed with the window 15e. For example, the touch sensor may be disposed on a circuit board of the display module 15f or included in the display module 15f. That is, the display unit 15a may form a touchscreen together with the touch sensor, and in this case, the touchscreen may serve as the user input unit 12c (cf. FIG. 1). If necessary, a physical key (e.g., push key) may be additionally provided, as the user input unit 12c, close to the display unit 15a corresponding to the touchscreen to facilitate user's inputs.

The circuit board 13 is the component on which various electrical components, especially, processors included in the control unit 18 are mounted together with other circuits and devices supporting them and may be installed in the case 110. Although not shown in the drawing, the components 11 to 19 shown in FIG. 1 may be directly installed on the circuit board 13 so that the control unit 18 can control the components. Alternatively, the components 11 to 19 may be installed in the case 110 so that they can be electrically connected to the circuit board 13. For instance, the window 15e (i.e., touch sensor) and the display module 15f can be connected to the circuit board 13 through wirings, respectively. In addition, the control unit 18 can be called various names such as a controller, a controlling device and the like and control all the components of the smart watch 100. Such controllable components include other components mentioned in the following description as well as the components shown in FIG. 1. This is why the control unit 18 can become a substantial component for appropriately performing a controlling method according to the present application by controlling operations of other components.

Further, the smart watch 100 may include a battery 19a (cf. FIG. 1) as the power supply unit 19 configured to supply power. The battery 19a may be installed in the case 110 either fixedly or detachably. And, the battery 19a can be charged via a power cable connected to the smart watch 100. Moreover, the battery 19a may be configured to enable wireless charging through a wireless charging device. In this case, wireless charging may be embodied by magnetic induction or resonance (e.g., magnetic resonance).

The smart watch 100 can provide, as a mobile terminal, various functions using the aforementioned various components. That is, the smart watch 100 may store various personal information of its user or access the personal information stored in other devices through the network. However, if the smart watch is manipulated by an unauthorized user, it may cause serious damage to the actual user due to the various functions that can be performed by the smart watch 100. To protect the important personal information and prevent the unauthorized operation, an appropriate security device should be installed in the smart watch 100, and as the security device, a fingerprint sensor 150 illustrated in FIGS. 2 to 5 may be included. The fingerprint sensor 150 can be referred to as a first fingerprint recognition unit in consideration of an additional fingerprint sensor 160, which will be described later. Further, the fingerprint sensor can be named a first recognition unit for convenience of description.

The first recognition unit 150 may be disposed on the bezel 130 as shown in the drawing. The bezel 130 may be disposed on an upper face of the smart watch 100, which is directly exposed to the user, and occupy a relatively large portion of the upper face. Since the first recognition unit 150 is installed in the bezel 130, the user can easily manipulate the first recognition unit 150. More particularly, as shown in FIG. 4, the first recognition unit 150 may be disposed on the upper face of the bezel 130, which is exposed to the user. In addition, the bezel 130 may include a mounting part 131 formed at the upper face. The mounting part 131 is configured to have a recess with a predetermined depth and thus can stably accommodate the first recognition unit 150. Meanwhile, the first recognition unit 150 may be continuously formed along the bezel 130. Similarly, the mounting part 131 may also be continuously extended for the continuous formation of the first recognition unit 150. In other words, the mounting part 131 may also be continuously extended along the bezel 130, and the continuously formed first recognition unit 150 may be disposed within the mounting part 131. Therefore, similar to the aforementioned shape of the bezel 130, the first recognition unit 150 may be extended along the boundary of the case 100 and formed in the shape of a ring or rim that encloses the display unit 15a. That is, the first recognition unit 150 may be formed over the entirety of the upper face of the bezel 130, and it allows the user to easily manipulate the first recognition unit 150.

Basically, the first recognition unit 150 may be configured to recognize a fingerprint of the user. For the fingerprint recognition, the first recognition unit 150 may include a plurality of main channels 151 as shown in FIG. 5(a). The main channels 151 are arranged in the form of a grid, and through the channels, a constant voltage change can be sensed. In addition, the first recognition unit 150 may include a plurality of sub-channels 152. Through the sub-channels 152, the constant voltage change can be sensed, and these channels are arranged between the main channels 151 in the grid form. More particularly, the sub-channels 152 are arranged between the main channels 151 such that the grid formed by the sub-channels 152 is denser that formed by the main-channels 151. Therefore, the main channels 151 and sub-channels 152 form a sensor array with high density and thus can have high sensitivity.

As shown in FIG. 5(b), when the user's finger F is in contact with the first recognition unit 150, it causes the constant voltage change. When the constant voltage change occurs, the first recognition unit 150 detects the constant voltage change using only the main channels 151 close to a location where the constant voltage change occurs. For convenience of description, FIG. 5(b) shows only the main channels 151 for detecting the constant voltage change in the first recognition unit 151, which are close to the location where the constant voltage change occurs. Actually, the constant voltage change in the first recognition unit 151 may occur due to not only the human finger but also other parts of the human body or other objects. Thus, when the constant voltage is changed, it should be checked whether the change is caused by the human finger F. In this case, since the human finger F has a unique constant voltage change value similar to other objects, the unique constant voltage change value may be previously configured with a fixed pattern. In addition, the predetermined pattern for the finger F may be stored in an inner storage device of the smart watch 100 such as the memory 17. Thus, to check whether the human finger F is in contact with the first recognition unit 150, the detected constant voltage change may be compared with the predetermined pattern for the finger F. If the detected constant voltage change matches with the predetermined pattern, it could be determined that the finger F is in contact with the first recognition unit 150. If it is confirmed that the human finger is in contact with the first recognition unit 150, a constant voltage value may be detected through all main channels 151 and sub-channels 152 located at the area where the constant voltage change occurs as shown in dotted lines of FIG. 5(*c*). By detecting such a large constant voltage value, a fingerprint image of the finger F can be obtained as shown in the drawing. Through a series of the above-described steps, the first recognition unit 150 can recognize the fingerprint of the finger F. As shown in FIG. 4, the first recognition unit 150 can be connected to the circuit board 13 and the control unit 180 through the wiring 153. Thus, the fingerprint recognized by the first recognition unit 150 is delivered to the control unit 180 and circuit board 13, and it may be stored in the memory 17 to perform a related operation immediately or additional processing.

In addition, although FIG. 3 shows that the array of the main channels 151 and sub-channels 152 depicted in FIG. 5 corresponds to a part of the first recognition unit 150, the array can be formed over the entirety of the first recognition unit 150. As described above, the first recognition unit 150 may be formed over the entirety of the upper surface of the bezel 130 in the ring or rim shape that encloses the display unit 15*a*, and thus the first recognition unit 150 can provide a remarkably large area for recognizing a fingerprint to the smart watch 100. In other words, the entire upper surface of the bezel 130 may be configured to recognize a fingerprint. Thus, a plurality of different fingers F can be simultaneously in contact with the first recognition unit 150, and as a result of the contact, fingerprints of the different fingers F can be simultaneously recognized. In general, the typical fingerprint recognition device has a small fingerprint recognition area and thus can recognize only a single fingerprint at one time. According to the present invention, the first recognition unit 150 can simultaneously recognize a plurality of different fingerprints due to the considerably large recognition area, and thus it can perform fingerprint recognition efficiently.

Further, owing to the large recognition area, the finger can move on the first recognition unit 150 while the finger is in contact with the first recognition unit 150. In addition, the first recognition unit 150 can recognize the fingerprint while the finger F moves. That is, while the finger F is swiped on the first recognition unit 150, the first recognition unit 150 can recognize the fingerprint. Specifically, while the finger F is swiped, the array of the main channels 151 and sub-channels 152 may continuously detect constant voltage changes from a tip of the moving finger F and thus obtain many detected values during a short time. By doing so, the fingerprint recognition can be performed while the finger F is moving, i.e., swiped, and therefore the first recognition unit 150 can not only obtain the fingerprint rapidly but also perform the fingerprint recognition efficiently.

Meanwhile, since the first recognition unit 150 provides the considerably large recognition area as described above, the user may use the recognition area as the input unit 15*c* for inputting a command to the smart watch 100. For example, as commands, various touches may be inputted from the finger F to the smart watch 100 through the first recognition unit 150. To this end, the first recognition unit 150 may be configured to recognize not only the fingerprint but also a movement of the finger F. That is, the first recognition unit 150 may be configured to recognize various touches from the finger F. More particularly, the first recognition unit 150 may further include a touch sensor for recognizing a touch and/or movement of the finger F. Since the touch sensor is already described above, its detailed descriptions will be omitted. The touch sensor may be formed along the first recognition unit 150. That is, the touch sensor may be formed over the entirety of the first recognition unit 150 and cover the entire upper surface of the bezel 130. Thus, a considerably large area is provided for the touch sensor, and thus the touch sensor can provide the additional input unit 15*c* to the user. Alternatively, the first recognition unit 150 can recognize touches from the user without a separate touch sensor. To extend functions of the first recognition unit 150 as described above, the structure and operating algorithm of the first recognition unit 150 may need to be changed. As described above, the first recognition unit 150 may be configured to not only perform the fingerprint recognition but also recognize the movement of the finger F, i.e., touch. Thus, the first recognition unit 150 can actually extend the small manipulation portion of the smart watch 100, thereby enabling the user to use the smart watch 100 conveniently and efficiently.

Figure 6:
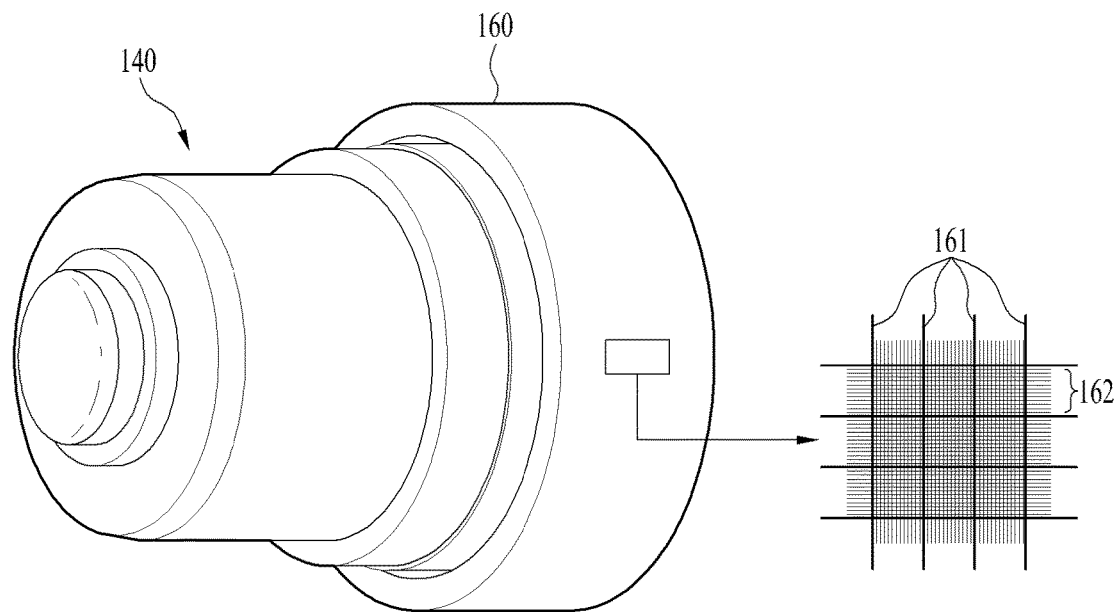
FIG. 6 is a perspective view illustrating a crown of the smart watch and a second recognition unit disposed thereon.

Meanwhile, as shown in FIG. 6, the smart watch may include the additional fingerprint sensor 160 as a security device. The fingerprint sensor 160 can be referred to the second fingerprint recognition unit 160 in consideration of the above-described first fingerprint recognition unit 150, but it can also be referred to as the second recognition unit 160 for convenience of description.

The second recognition unit 160 can be disposed on the crown 140 as shown in the drawing. The crown 140 is directly exposed to the user and frequently manipulated by the user. Thus, the second recognition unit 160 disposed on the crown 140 may be easily manipulated by the user. More specifically, the second recognition unit 160 may be disposed on an outer circumference surface of the crown 140, which is exposed to the user. Although not shown in the drawing, the crown 140 may include a mounting part for accommodating the second recognition unit 160 in its outer circumference surface similar to the mounting part 131 of the bezel 130. The second recognition unit 160 may be continuously formed along the outer circumference surface of the crown 140. Thus, the second recognition unit 160 may have a ring or rim shape that encloses the outer circumference surface of the crown 140 similar to the shape of the first recognition unit 150 and include a manipulation area enough to facilitate the user's manipulation.

Similar to the first recognition unit 150, the second recognition unit 160 may also be configured to recognize a fingerprint of the user. For the fingerprint recognition, the second recognition unit 160 may include a plurality of main channels 161 as shown in FIG. 6. The main channels 161 are arranged in the form of a grid, and through the channels, a constant voltage change can be sensed. In addition, the second recognition unit 160 may include a plurality of sub-channels 162. Through the sub-channels 162, the constant voltage change can be sensed, and these channels are arranged between the main channels 161 in the grid form. More particularly, the sub-channels 162 are arranged between the main channels 161 such that the grid formed by the sub-channels 162 is denser than that formed by the main-channels 161. Therefore, the main channels 161 and sub-channels 162 form a sensor array with high density and sensitivity. The second recognition unit 160 can recognize the fingerprint of the user by detecting the constant voltage change. Since such a fingerprint recognition process is equal to the above-described fingerprint recognition process for the first recognition unit 150, the descriptions and drawings of the recognition process for the first recognition unit 150 are incorporated by reference for the second recognition unit 160, and an additional description thereof will be omitted. Similar to the first recognition unit 150, the second recognition unit 160 can simultaneously recognize fingerprints of different fingers F. In addition, while the different fingers are moving, i.e., swiped on the second recognition unit 160, the second recognition unit 160 can recognize their fingerprints. Moreover, the second recognition unit 160 may be configured to recognize various touches and movements of the finger F. Since these features and functions are also similar to those of the first recognition unit 150, the descriptions and drawings of the first recognition unit 150 are incorporated by reference for corresponding features and functions of the second recognition unit 160, and a description thereof will be omitted.

As described above in the examples, the first and second recognition units 150 and 160 can provide the security function to the smart watch 100 by recognizing the user's fingerprints. That is, to enhance the security function, the smart watch 100 may have both of the first and second recognition units 150 and 160. Alternatively, the smart watch 100 may selectively have either the first recognition unit 150 or the second recognition unit 160, and even in this case, the smart watch can provide a sufficient level of the security function to the user.

Meanwhile, the intended security capability or function may be primarily achieved by the aforementioned structure of the smart watch 100. However, to achieve the intended technical purpose more reliably, proper control needs to be in place in consideration of the structure and features of the smart watch 100. In addition, cooperation between the user and the smart watch 100 should be considered in implementing functions of the smart watch 100. Thus, when control in various aspects including a user environment and user interface for the user is optimized, the above-described technical purpose can be achieved effectively and efficiently. Further, by doing so, user experience for the smart watch 100 such as ease of use, convenience of use, etc. can also be remarkably improved. In other words, the optimized control can significantly increase the product quality. For these reasons, a method for controlling the smart watch 100 described with reference to FIGS. 1 to 6 has been developed, and in the following description, the method will be described with reference to the accompanying drawings besides FIGS. 1 to 6. Unless specified otherwise, the descriptions with reference to FIGS. 1 to 6 are basically incorporated and included for descriptions and drawings of the control method.

Figure 7:
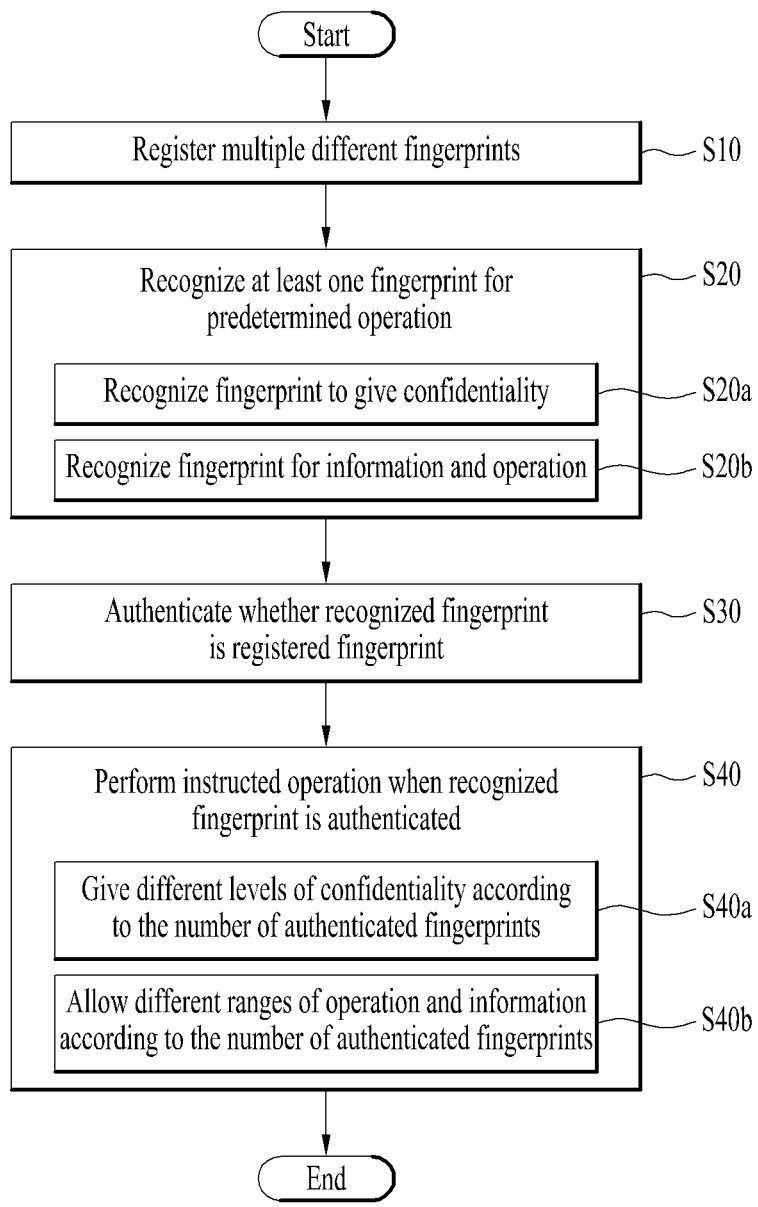
FIG. 7 is a flowchart schematically illustrating a method for controlling the smart watch described in the present disclosure.
Figure 8:
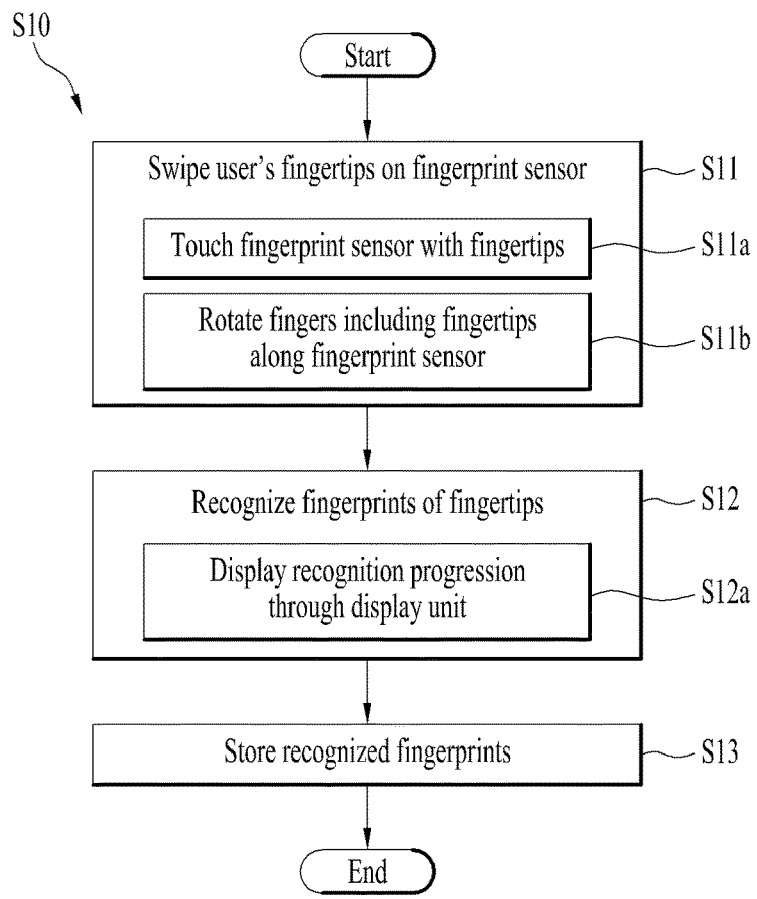
FIG. 8 is a flowchart illustrating in detail steps performed by the smart watch to simultaneously register different fingerprints.
Figure 9:
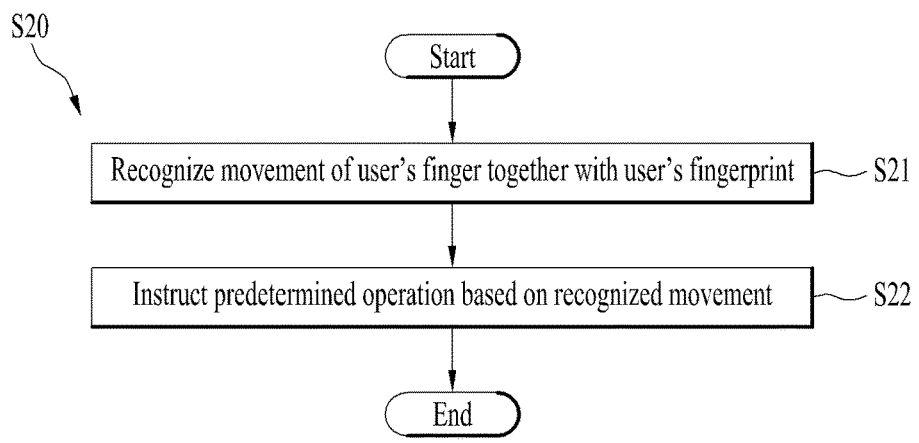
FIG. 9 is a flowchart illustrating in detail steps performed by the smart watch to recognize a user's fingerprint.

FIG. 7 is a flowchart schematically illustrating a method for controlling the smart watch described in the present disclosure, FIG. 8 is a flowchart illustrating in detail steps performed by the smart watch to simultaneously register different fingerprints, and FIG. 9 is a flowchart illustrating in detail steps performed by the smart watch to recognize a user's fingerprint. FIGS. 7 to 9 illustrates control methods for providing security functions to the smart device 100, and the control methods can be commonly applied to both the first and second recognition units 150 and 160. Meanwhile, FIGS. 10 to 24 illustrate examples related to the first recognition unit 150, and FIGS. 25 to 35 illustrate examples related to the second recognition unit 160. That is, the common control methods will be first described with reference to FIGS. 7 to 9. Next, based on specific steps of the control methods described with reference to FIGS. 7 to 9, individual examples, additional examples, or modified examples will be described with reference to FIGS. 10 to 35. However, for further understanding of the steps of the control methods according to FIGS. 7 to 9, the examples of FIGS. 10 to 35 may be incorporated by reference. In addition, unless specified otherwise, the description and features of the steps of the control methods in accordance with FIGS. 7 to 9 can be applied to corresponding steps of the examples of FIGS. 10 to 35. Moreover, as described above regarding the structure of the smart watch 100, the control unit 18 can be called various names such as a controller, a controlling device and the like, and it can control all the components of the smart watch 100 to perform predetermined operations. That is, the control unit actually controls all the steps of FIGS. 7 to 35, and thus all the steps, which will be described later, may be features of the control unit 18.

First, to use the smart watch 100, a user can wear the smart watch 100 on the body of the user. That is, the user can wear the watch 100 on the user's wrist, and the control methods will be described by assuming that the user is wearing the watch 100 on the user's wrist. Meanwhile, the user may use the watch 100 by holding the watch 100 with the user's hand instead of wearing it on the body. The control methods can be applied when the smart watch 100 is in contact with any body of the user including when the user wears it on the wrist.

Thereafter, the smart watch 100 can register a fingerprint [S10]. In the registration step S10, the smart watch registers the user's fingerprint rather than an arbitrary fingerprint. Here, the user may be an actual owner of the smart watch 100 or a person allowed to use the smart watch 100 except the owner. In the following description, the registered fingerprint may be used for a predetermined authentication process. If the fingerprint is authenticated, the smart watch 100 may allow not only access to and control of important information but also additional operations based on the information. Thus, in the registration step S10, only the aforementioned user's fingerprint is registered. In addition, since each of the first and second recognition units 150 and 160 provides a sufficiently large recognition area, a plurality of different fingers can be in contact with the recognition area. Thus, in the registration step S10, a plurality of different fingerprints may be registered, and the registration of the plurality of different fingerprints can be simultaneously performed.

In detail, in the registration step S10, the user may move the finger on the first or second recognition unit 150 or 160 to register the fingerprint as shown in FIG. 8 [S11]. More specifically, considering that the recognition area of the first or second recognition unit 150 or 160 is formed in the shape of a narrow ring or rim, the movement of the finger in the narrow recognition area may be the swipe of the finger on the first or second recognition unit 150 or 160. In addition, since the fingerprint is present at the tip of the finger, the user may swipe the user's fingertip on the first and second recognition unit 150 or 160. Moreover, multiple different fingerprints can be recognized through the large recognition area as described above. Thus, different from the typical fingerprint sensor that can recognize a single fingerprint at one time due to a small recognition area, the user can simultaneously swipe at least two different fingers (i.e., fingertips) on the first and second recognition unit 150 or 160 for the fingerprint recognition. Further, the user may swipe more than the two fingers for the same purpose.

In the swiping step S11, the user may simultaneously touch the first or second recognition unit 150 or 160 with two different fingers (i.e., fingertips) of the left or right hand [S11a]. In the swiping step S11, the user may swipe fingers of any hand. However, since the smart watch 100 is worn on one of the two wrists, the user may generally swipe fingers of the hand on which the smart watch 100 is not worn. Thus, it is preferable that the user simultaneously touches the first or second recognition unit 150 or 160 with two different fingers of one hand for swiping. Thereafter, the user may rotate the fingers along the first or second recognition units 150 or 160 while touching the first or second recognition units 150 or 160 with the fingers (fingertips) [S11b]. Since the first or second recognition units 150 or 160 is formed in the shape of the narrow ring or rim, the movement of the fingers along the first or second recognition unit 150 or 160 while the fingers are in contact with the first or second recognition unit 150 or 160 may correspond to the rotation of the fingers. In detail, the fingers moving along the first recognition unit 150 actually revolves at the center of the bezel 130 or smart watch 100, and the fingers moving along the second recognition unit 160 actually revolves at the center of the crown 140. In addition, considering the hand shape, it is preferred to swipe one of the thumb and other fingers on the finger on the first or second recognition unit 150 or 160 in the swiping step S11 to easily perform the rotation or revolution. For example, for this swipe, a combination of thumb and index fingers or a combination of thumb and middle fingers may be used. Through these combinations, the user may perform the swiping step S11 conveniently.

In the swiping step S11, the smart watch 100, i.e., the first or second recognition unit 150 or 160 can simultaneously recognize the fingerprints from the swiped finger(s) (i.e., fingertips) [S12]. While the fingers are swiped, the first or second recognition unit 150 or 160 may continuously detect constant voltage changes from the moving fingertips and obtain many detected values during a short time. Since the fingerprints are recognized in the swiping step S11, accurate fingerprint recognition can be performed rapidly and efficiently in the recognition step S12. In addition, as illustrated in the examples of FIGS. 10 to 26, the smart watch 100 can show progression of the fingerprint recognition for the user in the various ways [S12a]. For example, the fingerprint recognition progression can be expressed using a gauge or color. Due to this expression step S12a, the user may obtain information on the fingerprint recognition progression conveniently.

When the fingerprint recognition is completed, the smart watch 100 can store the recognized fingerprint [S13]. In detail, the control unit 18 may store the recognized fingerprint in the memory 17 to use if for user authentication. Through the storage step S13, the user's fingerprint can be finally registered in the smart watch 100.

Figure 10:
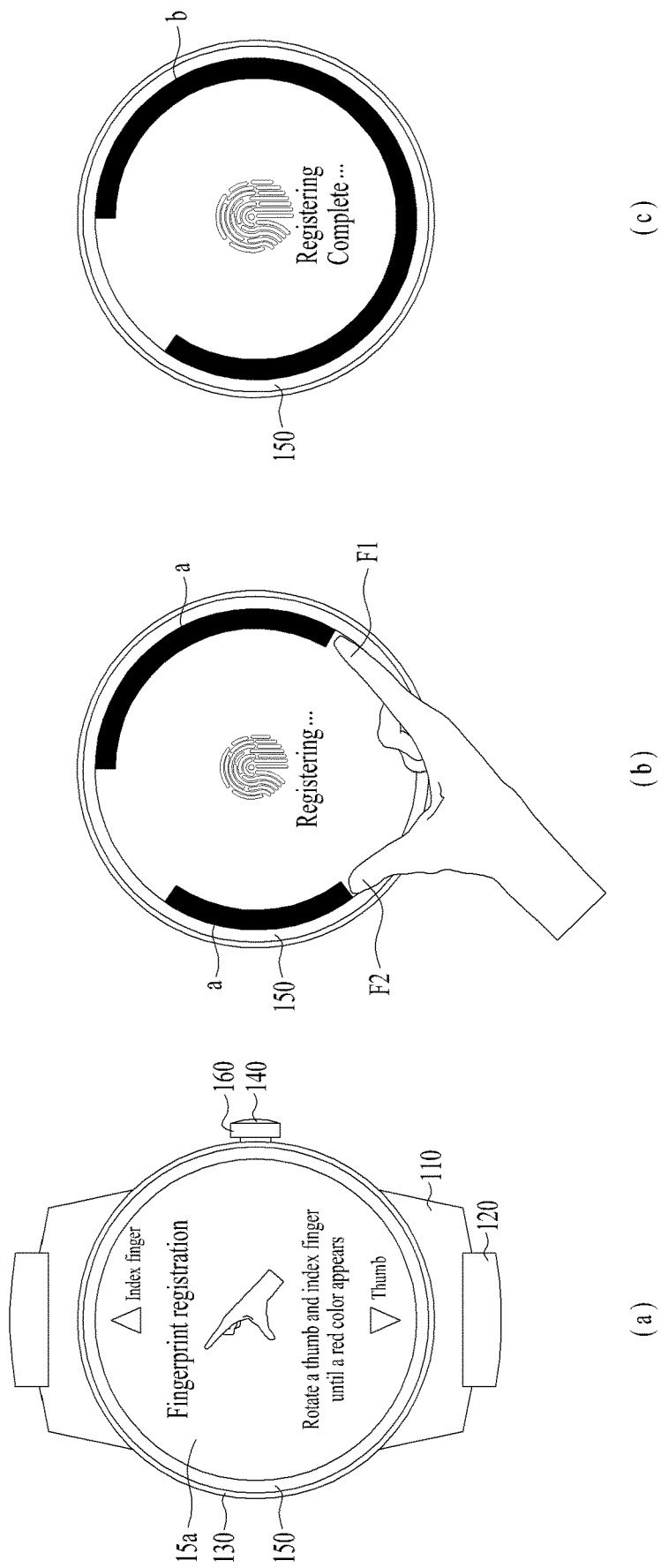
FIG. 10 is a schematic diagram illustrating in detail steps for simultaneously registering different fingerprints through the first recognition unit of the smart watch.
Figure 25:
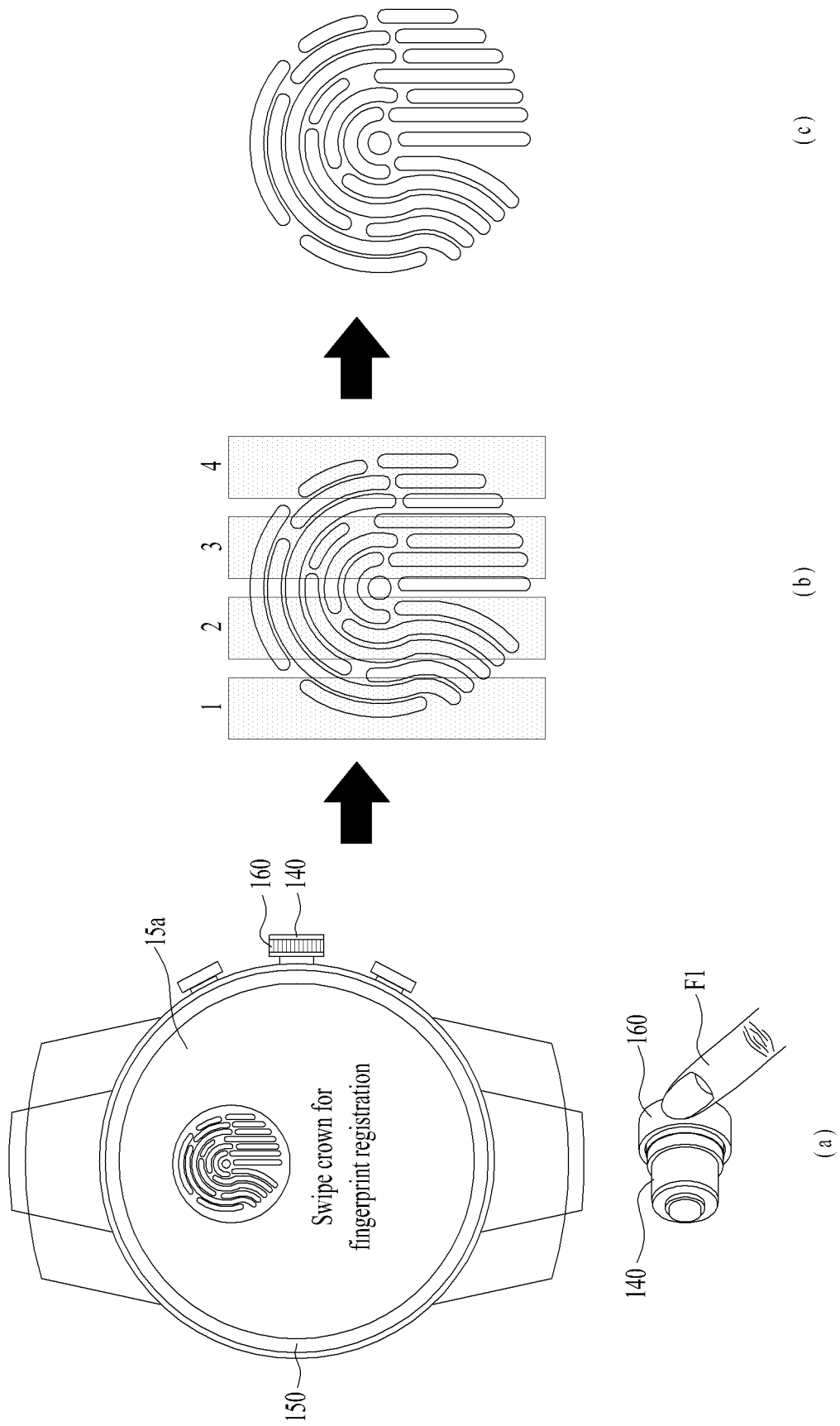
FIGS. 25 and 26 are schematic diagrams illustrating in detail steps for registering a fingerprint through a second recognition unit of the smart watch.
Figure 26:
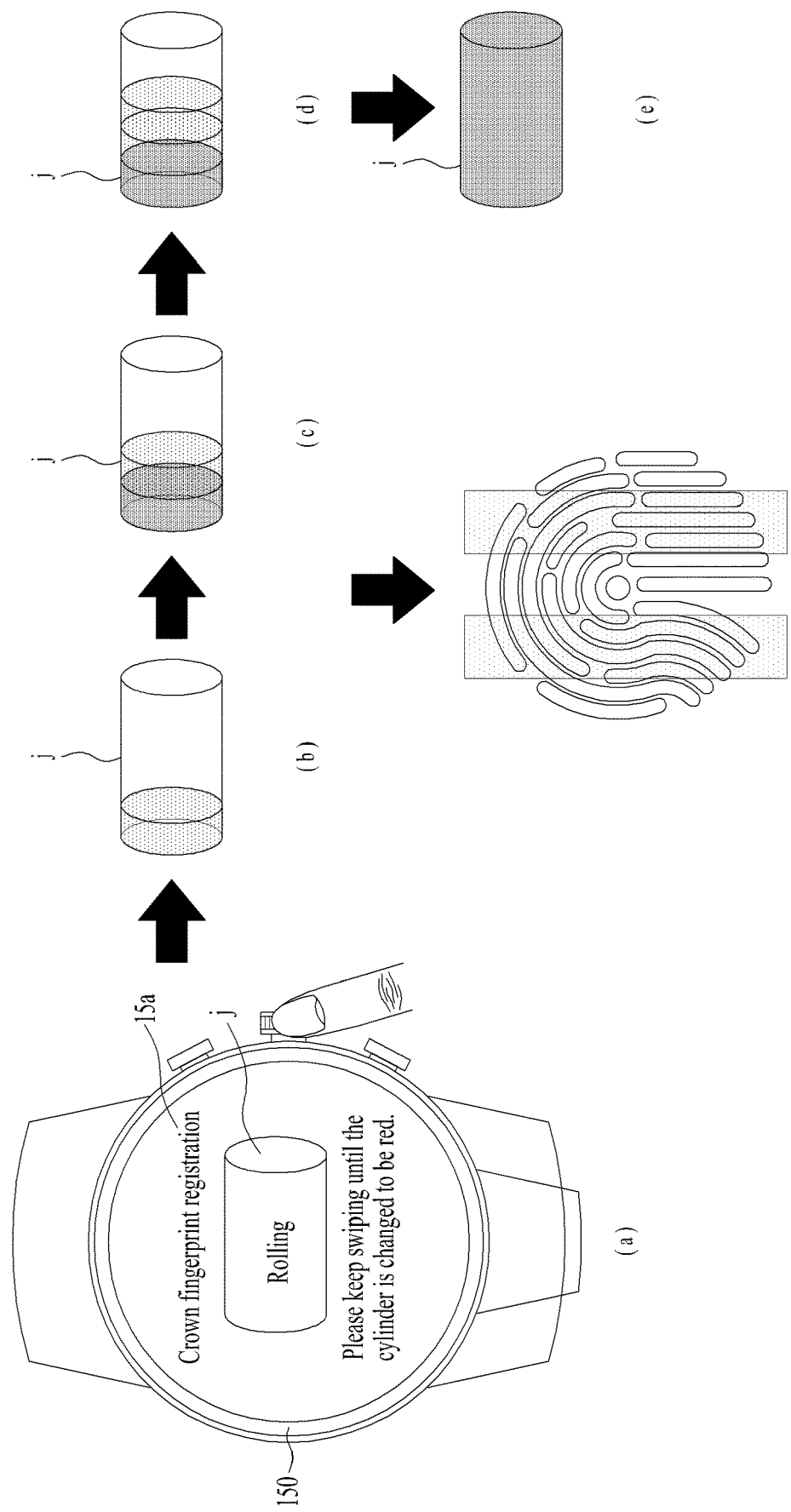

For further understanding of the aforementioned registration step S10, relevant examples will be described. FIG. 10 is a schematic diagram illustrating in detail steps for simultaneously registering different fingerprints through the first recognition unit of the smart watch, and FIGS. 25 and 26 are schematic diagrams illustrating in detail steps for registering a fingerprint through the second recognition unit of the smart watch.

First, referring to FIG. 10(*a*), as an example related to the first recognition unit 150, the smart watch 100 can provide a user interface for fingerprint recognition to the user through the display unit 15a. As shown in the interface, the user may use the thumb F2 and the index finger F1 of any hand for the fingerprint recognition. As described above, it is preferable that the thumb F2 is combined with any one of other fingers to easily perform the swipe for the fingerprint recognition. In addition, for easy swipe, the thumb F2 and the index finger F1 may be swiped from different points, more particularly, opposite points as shown in the interface.

Thereafter, the user may swipe the thumb F2 and the index finger F1 on the first recognition unit 150 [S11]. For this swipe gesture, the index finger F1 and the thumb F2 are in contact with the first recognition unit 150 [S11a], and then the index finger F1 and the thumb F2 may be rotated along the first recognition unit 160 while the fingers are in contact with the first recognition unit 150. In other words, the index finger F1 and the thumb F2 may be revolved at the center of the smart watch 100. While the fingers are swiped, the first recognition unit may recognize fingerprints of the index finger F1 and the thumb F2 rapidly and accurately [S12]. In addition, in the recognition process, the smart watch 100 can provide a gauge a indicating progression of the fingerprint recognition to the user through the display unit 15a. Finally, the recognized fingerprints are stored in the smart watch 100 as shown in FIG. 10(*c*), and the registration process is terminated. To easily inform the user that the registration is completed, a separate gauge or a different image b may be provided to the user through the display unit 15a.

As described above, the second recognition unit 160 can also recognize and register a plurality of different fingerprints similar to the first recognition unit 150. However, considering that the size of the crown 140 is relatively small and the second recognition unit 160 disposed on the crown 140 has a recognition area smaller than that of the first recognition unit 150, it is preferred to use the second recognition unit 160 for recognizing and registering a single fingerprint rather than a plurality of fingerprints. Therefore, in the examples of FIGS. 25 and 26, the steps for registering one fingerprint are described.

First, as shown in FIG. 25(*a*), the smart watch 100 can provide a user interface for fingerprint recognition to the user through the display unit 15a. Although the user may use any finger for the fingerprint recognition, the index finger F1, which is frequently used to manipulate the smart watch 100, may be the most convenient finger as shown in the drawing. Thereafter, as shown in FIG. 25(*a*), the user may swipe the index finger F1 on the second recognition unit 160. Based on swiping, the second recognition unit 160 can recognize the fingerprint of the index finger F1 at one time. However, it is preferred to recognize the fingerprint by repeating this process several times to accurately obtain the fingerprint. That is, the second recognition unit 160 can recognize partial fingerprints of the finger, which do not overlap with each other, several times to recognize the entire fingerprint. When the second recognition unit 160 recognizes a certain portion of the index finger F1 of the user and then recognizes another portion adjacent to the recognized portion as shown in FIG. 25(*b*), the second recognition unit 160 may obtain the entire fingerprint as shown in FIG. 25(*c*).

In addition, in the recognition process, the smart watch 100 can provide progression of the fingerprint recognition to the user through the display unit 15a. As shown in FIG. 26(a), the smart watch 100 can provide an interface including a gauge j indicating the progression to the user. Thereafter, while the partial fingerprints of the index finger F1 are obtained repeatedly as shown in FIG. 25(b), the gauge j may display the amount of obtained partial fingerprints as shown in FIGS. 25 (b) to (d). When the fingerprint recognition is completed as shown in FIG. 26(e), the recognized fingerprint is stored in the smart watch 100, and then the registration process is terminated. To easily inform the user that the registration is completed, visual information may be provided to the user through the display unit 15a.

Meanwhile, when the smart watch 100 is worn on the user's body, the user may instruct the smart watch 100 to perform an operation that the user desires as similar in the aforementioned registration step S10. As defined in the registration step S10, the user may be the actual owner of the smart watch 100 or the person allowed to use the smart watch 100 except the owner. However, in some cases, a third-party person who is not allowed to use the smart watch 100 may manipulate the smart watch 100. Thus, in the remaining steps except the registration step S10, besides the owner and allowed person, the user may allow the third-party person to use the smart watch 100. For the smart watch 100, various functions for satisfying the user demand may be implemented, and these functions can be performed through cooperation between the components of the smart watch 100. Thus, the user may input a predetermined instruction to the smart watch 100 to perform an operation for the desired function. The instruction step may be the most basic step in terms of function implementation, and more particularly, controlling. However, the user's desired operation may include not only access to and control of important information, i.e., personal information of the user but also additional operations based on the information. In this case, if the fingerprint is already registered through the registration step S10, the smart watch 100 can recognize the user's fingerprint to perform the intended operation [S20]. In the registration step S10, steps for recognizing the fingerprint are accompanied before storage of the fingerprint. The sub-steps for the fingerprint recognition in the recognition step S20 are equal to the fingerprint recognition steps of the registration step S10, that is, the swipe and recognition steps S11 and S12. However, in the following examples, the number of fingerprints actually recognized in the recognition step S20 may be changed according to required authentication levels. Hence, the descriptions and drawings of the fingerprint recognition process of the registration step S10, i.e., all the steps of the registration step S10 are incorporated by reference for the second recognition unit 160, and a description thereof will be omitted.

Meanwhile, since each of the first and second recognition units 150 and 160 provide the considerably large recognition area, the user may use the recognition area as the input unit 15c for inputting a command to the smart watch 100. For example, as commands, various touches may be inputted from the finger to the smart watch 100 through the first recognition unit 150. To this end, each of the first and second recognition units 150 and 160 may be configured to recognize not only the fingerprint but also the movement of the finger. That is, the first and second recognition units 150 and 160 may be configured to recognize various touches from the finger. For these reasons, in the recognition step S20, the smart watch 100 can simultaneously recognize the user's fingerprint and the movement of the user's finger, i.e., the touch [S21]. In addition, the user may instruct the smart watch 100 to perform a prescribed operation based on the movement recognized in the recognition step S21 [S22]. Since the movement recognition step S21 and the instruction step S22 are based on additional functions of the first and second recognition units 150 and 160, i.e., the recognition of the movement of the finger, they are performed in addition to the fingerprint recognition step S20. In other words, operations instructed through the recognition and instruction steps S21 and S22 are different from the operations intended in the recognition step S20. In detail, the operations intended in the fingerprint recognition step S20, i.e., the operations calling the fingerprint recognition unit S20 relates to important personal information of the user or requires other security operations. On the other hand, the operations performed in the recognition and instruction steps S21 and S22 may simply relate to or support the operations intended in the fingerprint recognition unit S20. For example, simple manipulation of the user interface or manipulation for processing the recognition step S20 may be performed as the operations in the recognition and instruction steps S21 and S22, using the first and second recognition units 150 and 160 instead of using the input unit 12c of the smart watch 100.

As described above, the recognition step S20 may be required and performed for the operations related to the user's personal information and other security-related operations. In detail, the recognition step S20 may change a configuration for the security-related information in the smart watch 100. That is, the recognition step S20 can give prescribed confidentiality to information provided by the smart watch 100 [S20a]. For example, the user may set the smart watch 100 such that the smart watch 100 requires authentication when the user intends to access or use information, which has not been protected, in next time. In addition, the user may assign additional confidentiality and authentication requirements to information with predetermined confidentiality and authentication requirements. Since such assignment and change of the confidentiality directly relates to security of information included in the smart watch 100, the recognition step S20 and an authentication step, which will be described later, are required. Moreover, the recognition step S20 may be required to access prescribed information in the smart watch 100 or indicate a prescribed operation [S22b]. Regarding the information having the confidentiality given in the step S20a and the operation performed based on this information, the fingerprint recognition S20 and authentication S30 are required for security. Furthermore, if protection is required in consideration of features of the information and operation even though confidentiality is not given specifically, the recognition and authentication steps S20 and S30 may also be required.

After the recognition step S20, the smart watch 100 may determine whether the recognized fingerprint is the registered fingerprint [S30]. As described above regarding the first and second recognition units 150 and 160, in the authentication step S30, the smart watch 100 may compare the fingerprint registered in the registration step S10 and the fingerprint recognized in the recognition step S20. If the recognized fingerprint is different from the registered fingerprint, an owner of the recognized fingerprint is not authenticated as the user. On the contrary, if the recognized fingerprint matches with the registered fingerprint, the recognized fingerprint is authenticated, and the owner of the recognized fingerprint can be authenticated as the user. Since the first and second recognition units 150 and 160 can simultaneously recognize multiple different fingerprints as described above, the smart watch 100 can simultaneously register at least two fingerprints in the registration step S10.

Similarly, a plurality of fingerprints, i.e., at least two fingerprints can be recognized in the recognition step S20. Hence, at least two different fingerprints can be simultaneously authenticated in the authentication step S30 using the registered and recognized fingerprints. Alternatively, in the authentication step S30, a single fingerprint can also be authenticated according to a required authentication level.

If the fingerprint recognized in the recognition step S30 is authenticated, the smart watch 100 may performed an indicated operation [S40]. On the other hand, if the fingerprint recognized in the recognition step S30 is not authenticated, the intended operation is not performed, and the smart watch 100 may refuse to perform the operation. Specifically, an additional command can be inputted to the smart watch 100 to perform the intended operation, and corresponding component may perform the intended operation according to the inputted command. Thus, the smart watch 100 can finally provide the intended function.

In addition, since the first and second recognition units 150 and 160 of the smart watch 100 can simultaneously recognize and authenticate multiple different fingerprints, a performance step S40 may be additionally controlled depending on the number of authenticated fingerprints. That is, different operation may be performed according to the number of fingerprints authenticated in the authentication step S30 (the number of simultaneously authenticated fingerprints). For example, different levels of confidentiality can be given to information in the smart watch 100 depending on the number of the fingerprints authenticated in the authentication step S30 (the number of the simultaneously authenticated fingerprints). In addition, different ranges of information and operation may be allowed for the user depending on the number of the fingerprints authenticated in the authentication step S30 (the number of the simultaneously authenticated fingerprints).

In addition to the common and conceptual control methods described with reference to FIGS. 7 to 9, actual examples will be described with reference to relevant drawings. Among the actual examples, the examples related to the first recognition unit 150 will be first described. Although most of the examples are based on the control methods of FIGS. 7 to 9, additional embodiments extended from the conceptual control methods of FIGS. 7 to 9 will also be described.

Figure 11:
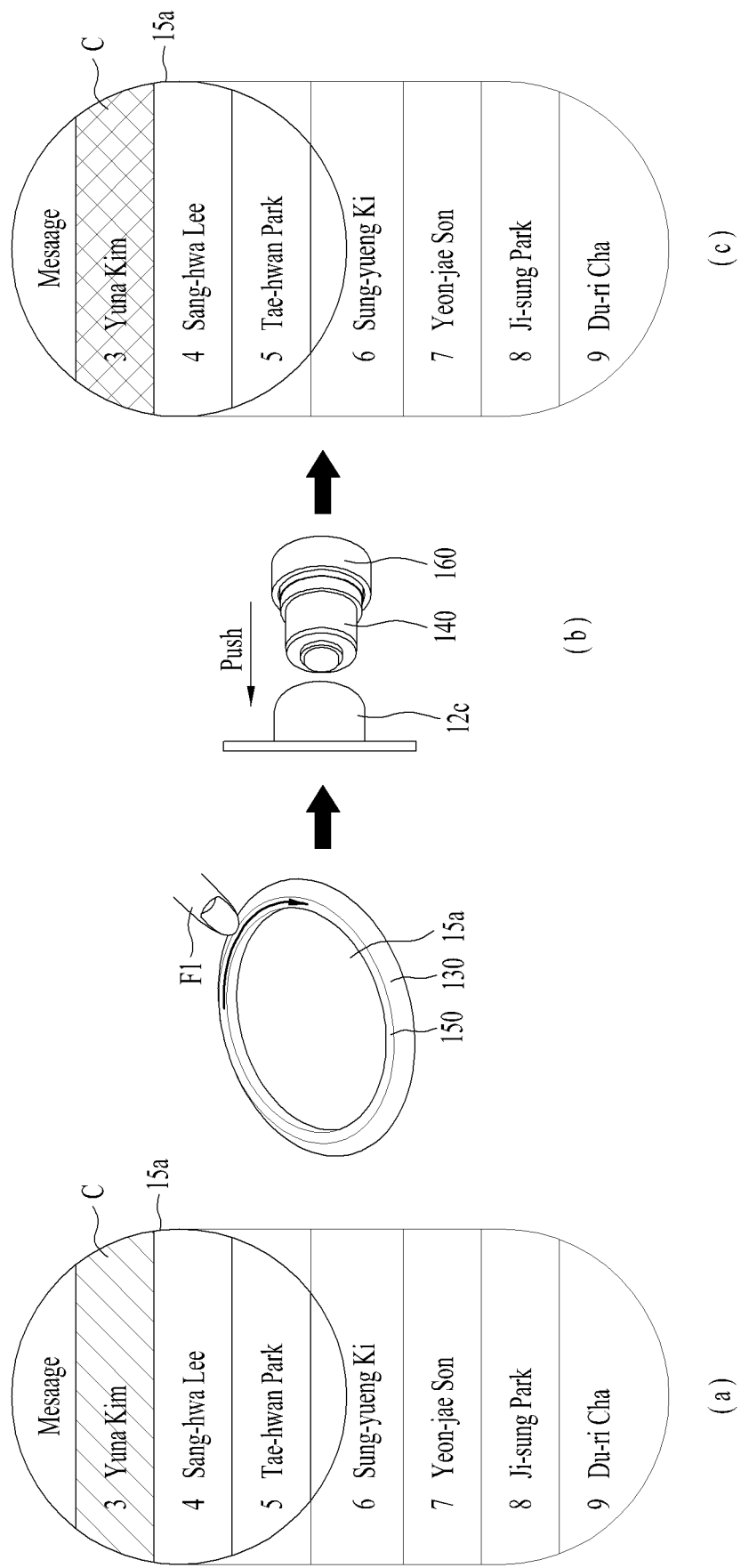
FIG. 11 is a schematic diagram illustrating in detail steps for giving different levels of confidentiality to specific information according to the number of fingerprints authenticated through the first recognition unit of the smart watch in reference to a text message.

First, among the actual examples of the first recognition unit 150, an actual example related to a text message provided by the smart watch 100 will be first described. The smart watch 100 can receive a text message and inform the user of the received text message. However, an operation related to text messages may accompany not only access to and control of user's personal information, i.e., user's privacy but also an additional operation based on the personal information. Thus, the security functions in accordance with the control methods of FIGS. 7 to 9 may be provided for the operation related to text messages. Specifically, as one of the security functions for text messages, the user can give prescribed confidentiality to information related to text messages provided by the smart watch 100 [S20a]. That is, the user may configure the smart watch 100 such that a prescribed authentication process is required when the smart watch 100 intends to access a message received from a specific person. FIG. 11 is a schematic diagram illustrating in detail steps for giving different levels of confidentiality to specific information according to the number of fingerprints authenticated through the first recognition unit of the smart watch in reference to a text message.

As shown in FIG. 11(a), the smart watch 100 can provide a message list to the user through the display unit 15a. The list may be arranged according to names of senders and include a name of a specific person c to which the user desires to give confidentiality. Since the display unit 15a is small, the names in the circle are actually displayed on the display unit 15a. The remaining names are included in the list, but they are not displayed on the display unit 15a. The remaining names can be sequentially displayed on the display unit 15a by scrolling. To give confidentiality, whether the user can configure the security function should be first authenticated. To this end, as shown in the drawing, the user may place the user's index finger F1 on the first recognition unit 150 so that the smart watch 100 can recognize the user's fingerprint [S20]. In addition, the user may scroll the message list to select the specific person c, and scrolling may be performed on the first recognition unit 150 as shown in the drawing. Specifically, in FIG. 11(a), when the user swipes the first recognition unit 150 using the index finger F1, the fingerprint recognition and scrolling can be simultaneously performed. The smart watch 100 can recognize the user's fingerprint [S20] and at the same time, recognize the movement of the user's finger [S21]. Thereafter, the smart watch 100 can perform a prescribed operation based on the recognized movement [S22]. That is, since the smart watch 100 performs not only the user recognition but also scrolling while the user swipes to scroll the list, the user can use the smart watch 100 more conveniently.

Figure 12:
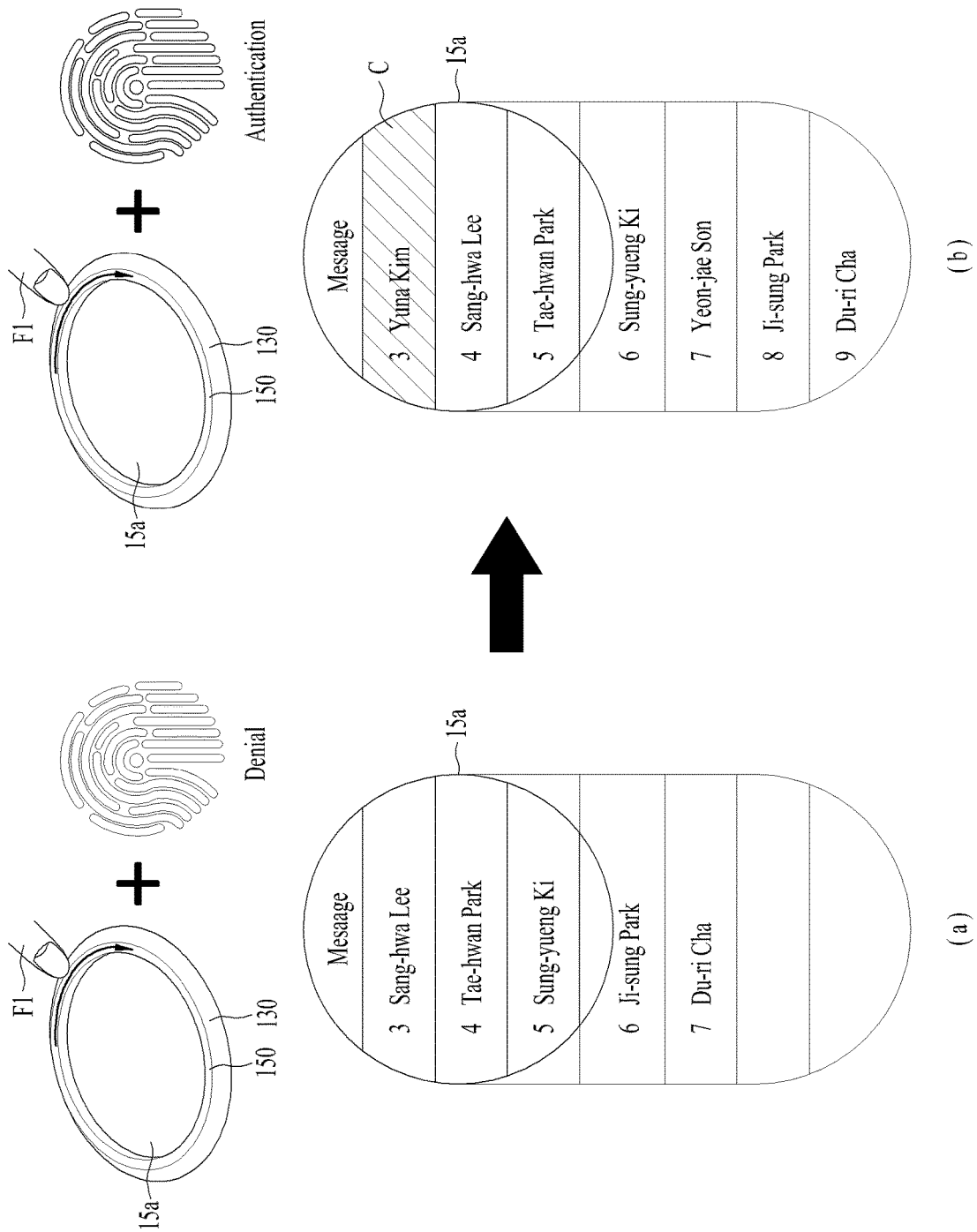
FIGS. 12 and 13 are schematic diagrams illustrating in detail examples of steps for providing different ranges of information and operation according to the number of fingerprints authenticated through the first recognition unit of the smart watch in reference to a text message.

When the recognized fingerprint is authenticated in comparison with the registered fingerprint [S30], the user may select the scrolled specific person c by pushing the crown 140 as shown in FIG. 11(b). When the crown 140 is pushed, a switch 12c adjacent to the crown 140 of the smart watch 100 is pushed, and an electrical signal for selecting the specific person c may be transmitted to the circuit board 13 and control unit 18. Meanwhile, the selection through the crown 140 may be first perform, and then the recognized fingerprint may be authenticated [S30]. When the fingerprint is authenticated, the smart watch 100 can give confidentiality to the specific person c and the message therefrom [S40] as shown in FIG. 11(c). As an example of giving confidentiality, the name of the specific person c having the given confidentiality may be hidden from the list to prevent an authorized user from seeing the name as shown in FIG. 12.

As one of the security functions for text messages, in addition to giving of confidentiality, the smart watch 100 may request the user to authenticate a fingerprint to access a specific text message or perform a related operation [S20b]. FIG. 12 is a schematic diagram illustrating in detail an example of steps for providing different ranges of information and operation according to the number of fingerprints authenticated through the first recognition unit of the smart watch in reference to a text message.

As described in the steps of FIG. 11, the name of the specific person c is hidden from the list due to the given confidentiality. To access information on the hidden specific person c, the smart watch 100 may request the user to recognize and authenticate the user's fingerprint [S20 and S30]. As shown in FIG. 12(a), if the recognized fingerprint is not authenticated [S30], the intended operation may be refused by the smart watch 100. In other words, the name of the specific person c and the message therefrom may not be shown still. On the contrary, as shown in FIG. 12(b), if the recognized fingerprint is authenticated [S30], the name of the specific person c is included in the list, and the user can access the message from the specific person c [S40].

In addition, since the first recognition unit 150 can simultaneously recognize a plurality of different fingerprints, different operation can be performed in the performance step S40 according to the number of authenticated fingerprints. Specifically, in FIGS. 11 and 12, different levels of confidentiality may be given to the specific person c according to the number of the authenticated fingerprints [S40*a*]. For example, although not shown in the drawings, if only the fingerprint of the index finger F1 is authenticated when confidentiality is given, the name of the specific person c may be continuously displayed but authentication of another fingerprint may be required to access the message from the specific person c. Moreover, although not shown in the drawing, if two fingerprints, i.e., fingerprints of the index finger F1 and thumb F2 are authenticated when confidentiality is given, the name of the specific person c having the given confidentiality may be hidden from the list to prevent an authorized user from seeing the name as shown in FIG. 11.

Figure 13:
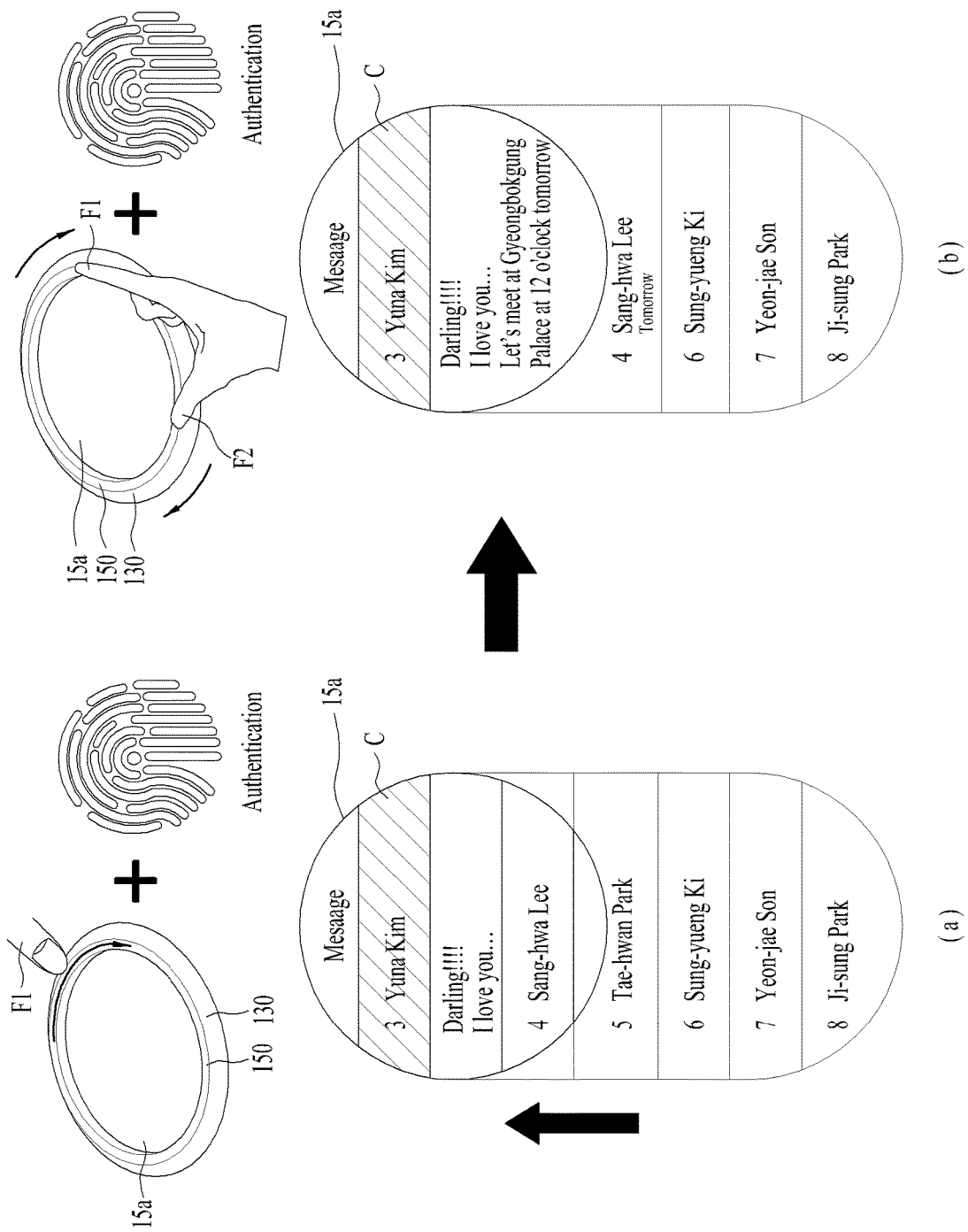

Further, the smart watch 100 may allow different ranges of information and operation in reference to a text message for the user according to the number of the authenticated fingerprints [S40*b*]. FIG. 13 is a schematic diagram illustrating in detail an example of steps for providing different ranges of information and operation according to the number of fingerprints authenticated through the first recognition unit of the smart watch in reference to a text message. In FIG. 13, the message list shows the name of the specific person c in spite of the predetermined confidentiality. As shown in FIG. 13(*a*), if one fingerprint, e.g., the fingerprint of the index finger F1 is recognized and authenticated to access the message of the specific person c [S20 and S30], the smart watch 100 may show a part of the message from the corresponding specific person c due to a low authentication level. On the other hand, if two fingerprints, e.g., the fingerprints of the index finger F1 and thumb F2 are recognized and authenticated [S20 and S30], the smart watch 100 may show the entirety of the message from the corresponding specific person c due to a high authentication level.

Figure 14:
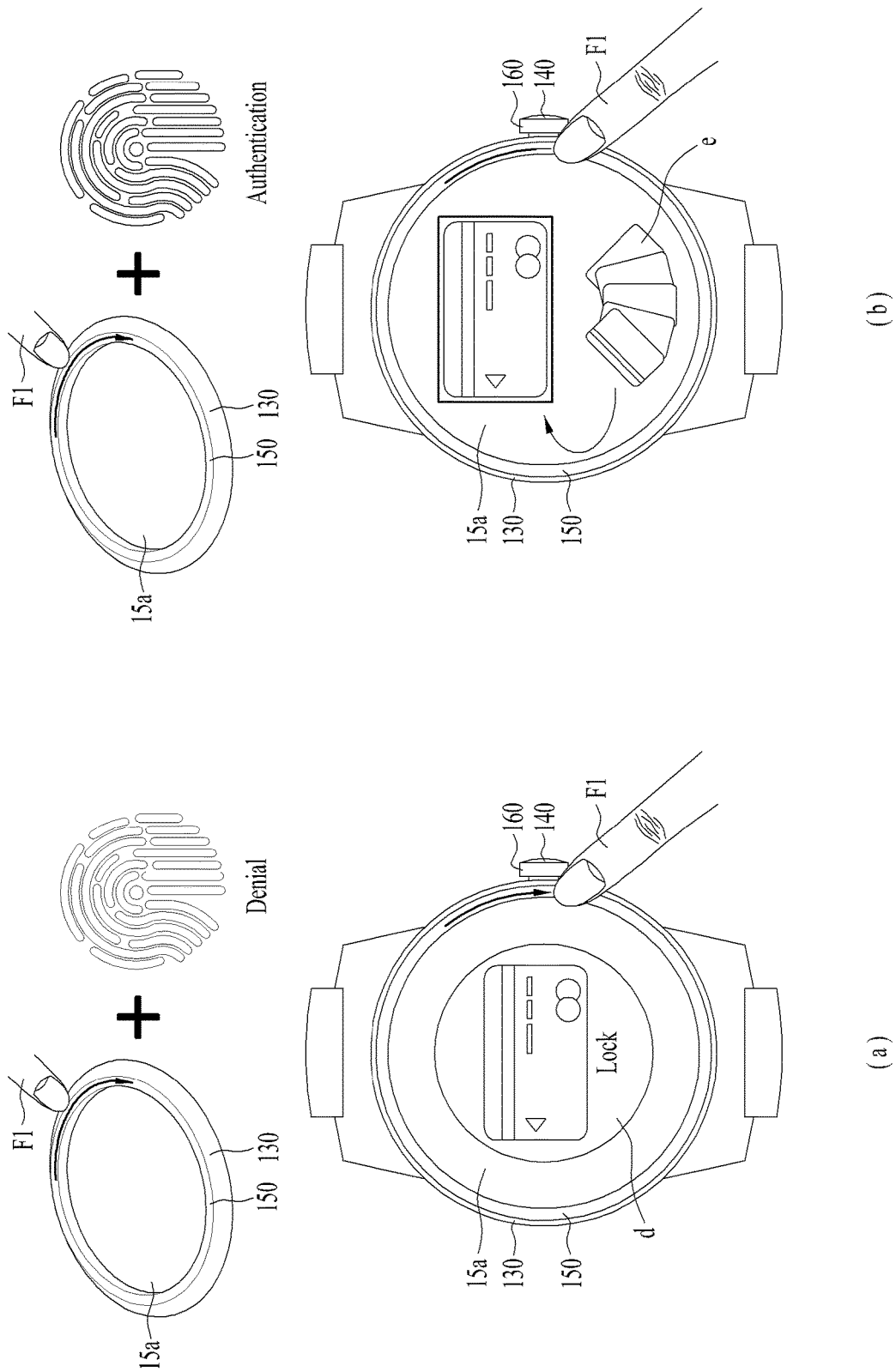
FIGS. 14 and 15 are schematic diagrams illustrating in detail examples of steps for providing different ranges of information and operation according to the number of fingerprints authenticated through the first recognition unit of the smart watch with regard to mobile payment.
Figure 15:
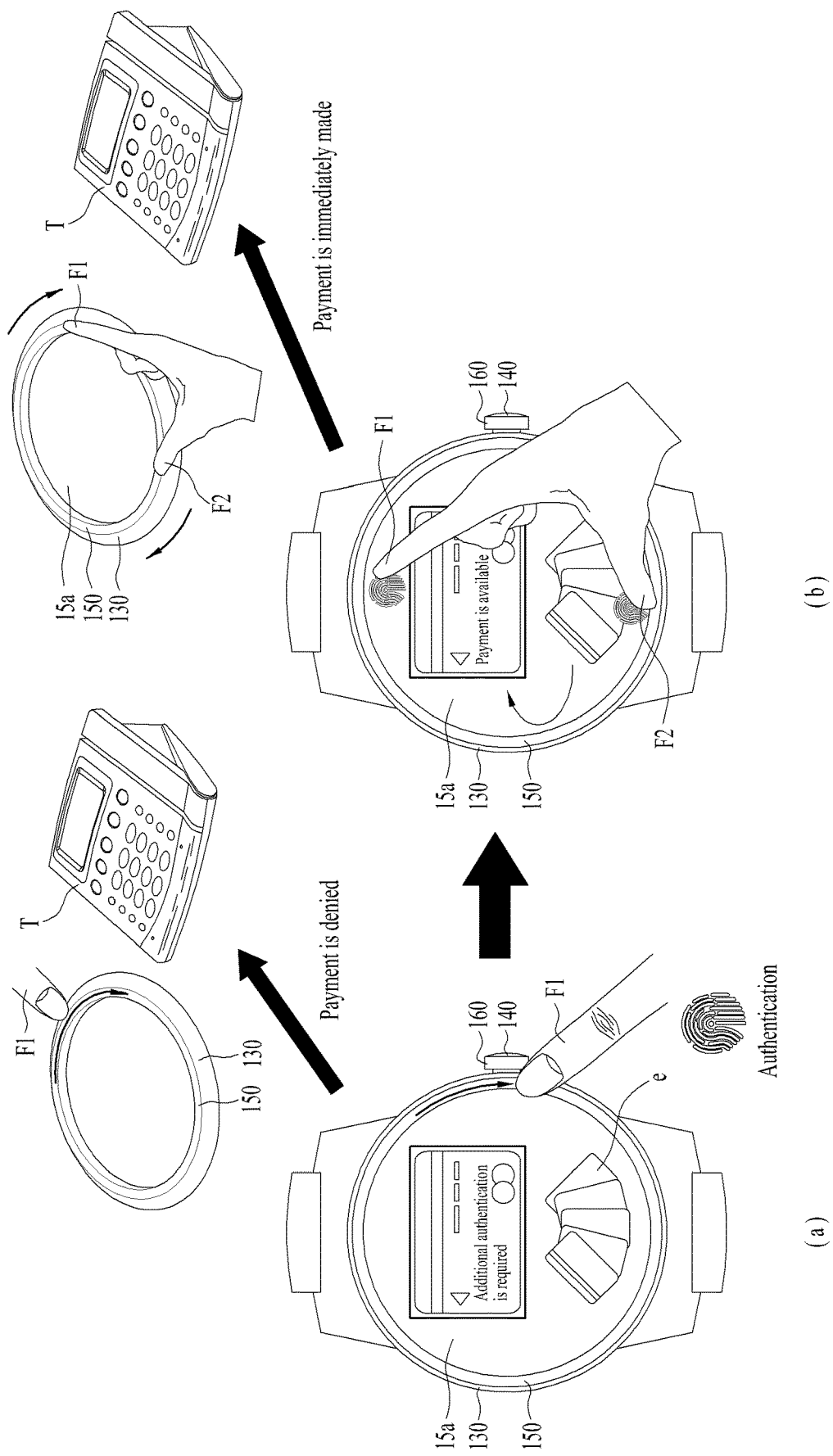

In addition to the aforementioned actual example related to text messages, an actual example related to mobile payment performed by the smart watch 100 will be described. The user using the smart watch 100 can make payments on various items such as purchase billing, tax, and the like. However, this payment may accompany not only access to and control of user's personal information, i.e., user's credit information but also an additional operation based on the personal information. Thus, the security functions in accordance with the control methods of FIGS. 7 to 9 may be provided for the operation related to the mobile payment. The smart watch 100 may request the user to recognize and authenticate a fingerprint to perform operations related to payment using the credit information [S20*b*]. FIGS. 14 and 15 are schematic diagrams illustrating in detail examples of steps for providing different ranges of information and operation according to the number of fingerprints authenticated through the first recognition unit of the smart watch with regard to mobile payment.

As shown in FIG. 14(*a*), due to previously given confidentiality [S20*a*, S30, and S40*a*], detailed credit information may be hidden from a payment interface. To inform that the credit information is hidden, a specific image or an icon d may be displayed on the display unit 15*a* as shown in the drawing. The smart watch 100 may request the user to recognize and authenticate a fingerprint to access the hidden credit information [S20]. As shown in FIG. 14(*a*), if the recognized fingerprint is not authenticated [S30], the intended operation may be refused by the smart watch 100. In other words, the detailed credit information may not be shown still in the payment interface. On the contrary, as shown in FIG. 14(*b*), if the recognized fingerprint is authenticated [S30], the detailed credit information appears in the payment interface, and the user can access the credit information [S40]. For example, the detailed credit information may be information on available credit cards of the user, and as shown in the drawing, information on the credit cards may be distinguished using different icons e.

In addition, since the first recognition unit 150 can simultaneously recognize a plurality of different fingerprints, the smart watch 100 may allow different ranges of information and operation with regard to mobile payment according to the number of the authenticated fingerprints [S40*b*]. As shown in FIGS. 14(*b*) and 15(*a*), if one fingerprint, e.g., the fingerprint of the index finger F1 is recognized and authenticated [S20 and S30], the smart watch 100 may show the icons e corresponding to the available credit cards due to the low authentication level as described above. However, under the low authentication level, the payment cannot be actually performed using the displayed credit card information. That is, the smart watch 100 cannot transmit the credit card information to a payment server T located in the network. On the other hand, if two fingerprints, e.g., the fingerprints of the index finger F1 and thumb F2 are recognized and authenticated [S20 and S30], the smart watch 100 can make a payment using the credit card information due to a relatively high authentication level [S40]. That is, information on a credit card f selected by the user can be transmitted from the smart watch 100 to the payment server T for the payment.

Figure 16:
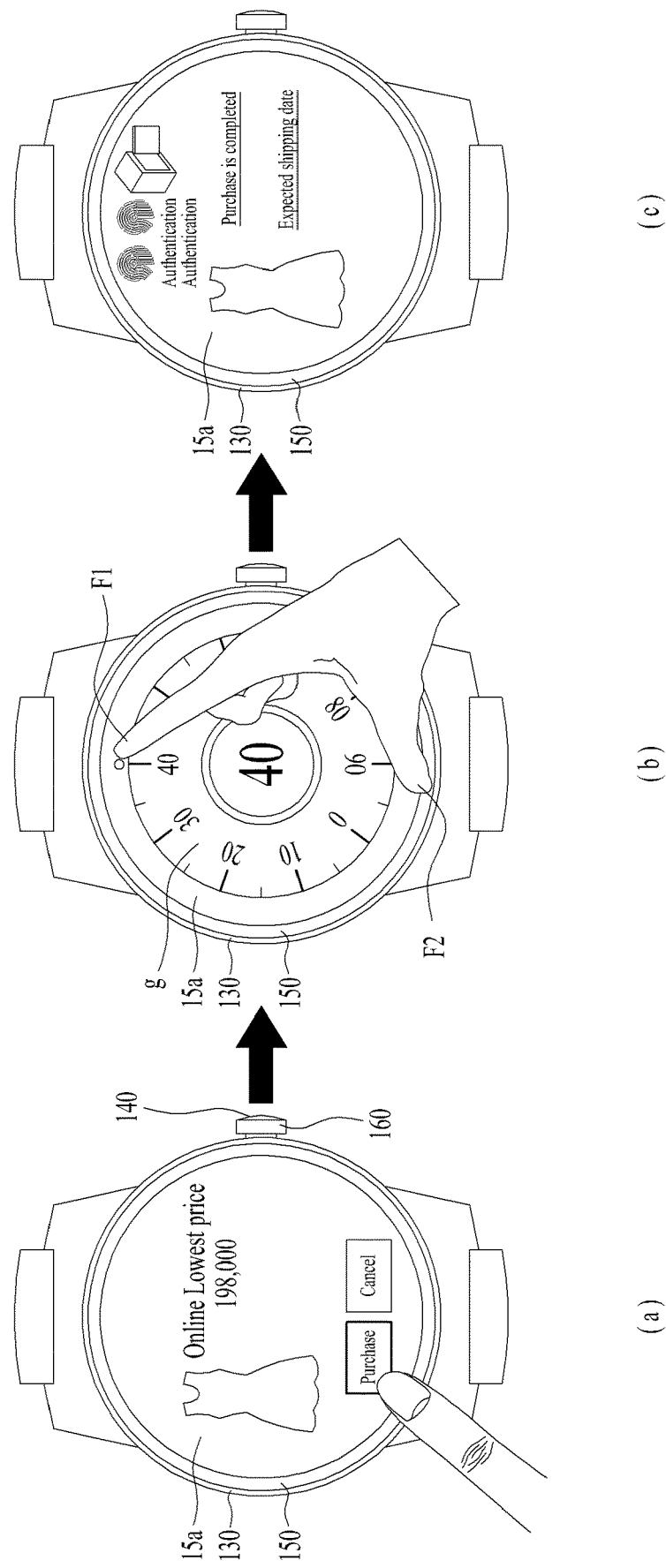
FIG. 16 is a schematic diagram illustrating in detail another example of the steps illustrated in FIG. 15 with regard to mobile payment.

In addition, in FIGS. 14 and 15, regarding the payment using the credit information, the smart watch 100 may request the user to recognize and authenticate a fingerprint using different methods so that a security function can be provided for the mobile payment [S20*b*]. FIG. 16 is a schematic diagram illustrating in detail another example with regard to mobile payment.

As shown in FIG. 16(*a*), the smart watch 100 can provide a prescribed purchase interface to the user, and the user may request purchase of a desired product by touching, for example, a "purchase" button. Thereafter, the smart watch 100 may request the user to recognize and authenticate a fingerprint for the purchase request [S20]. As shown in FIG. 16(*b*), the payment interface may provide a virtual dial g, and to provide an improved payment security function, both the fingerprint authentication and a preconfigured password may be required. Using the interface shown in FIG. 16(*b*), the user may conveniently and simultaneously perform the fingerprint recognition [S20] and the finger movement recognition/operation instruction [S21 and S22]. Specifically, for the fingerprint recognition, the user may swipe the first recognition unit 150 using fingers, e.g., the index finger F1 and thumb F2 [S20]. At the same time, the user may swipe the first recognition unit 150 using the index finger F1 and thumb F2 to rotate the virtual dial g [S21 and S22]. While the user performs swiping, the smart watch 100 may recognize the user's fingerprints and the movements of the fingers [S20 and S21] and rotate the dial g to input the password based on the recognized movements. As shown in FIG. 16(*c*), if the recognized fingerprints are authenticated [S30] and the password is exactly inputted, the smart watch 100 may make a payment using stored credit information [S30]. As shown in the interface of FIG. 16(*c*), the smart watch 100 may show the user a message saying that the payment is completed and an icon or image showing success of the fingerprint recognition and password input.

Figure 17:
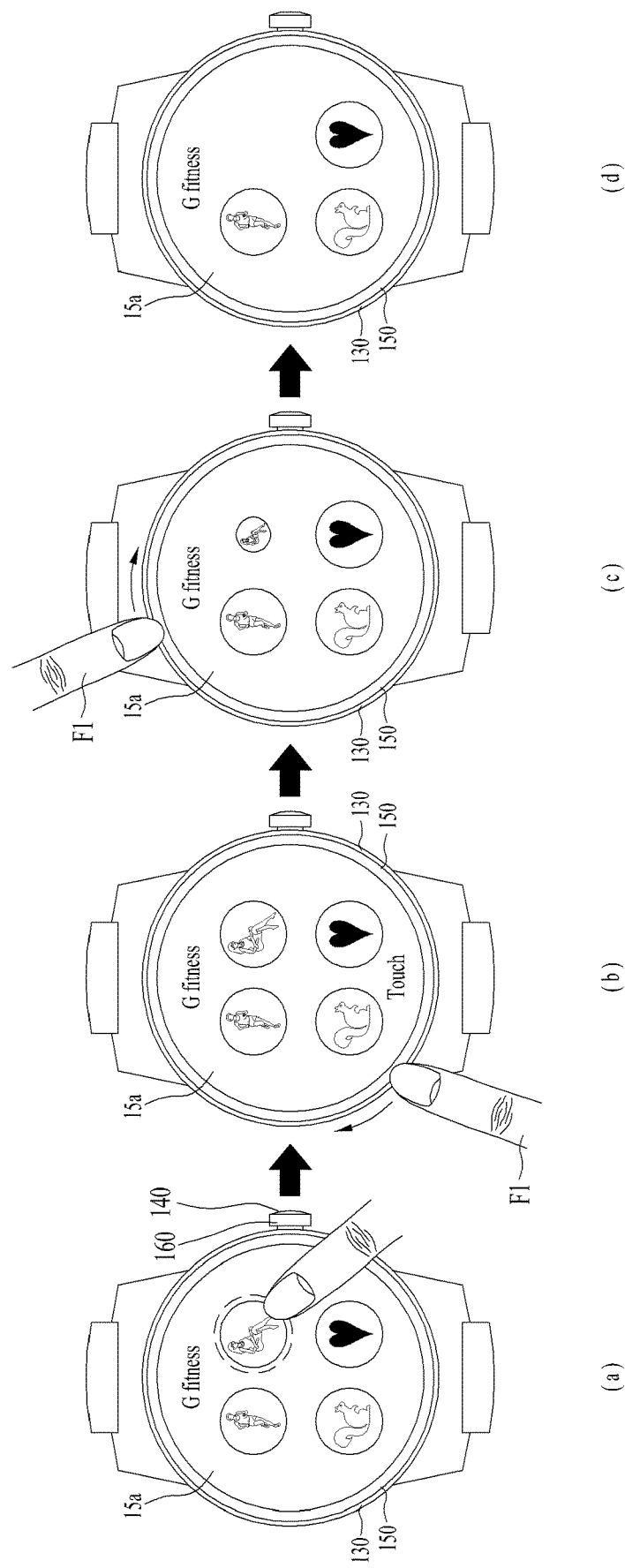
FIG. 17 is a schematic diagram illustrating in detail steps for giving different levels of confidentiality to specific information according to the number of fingerprints authenticated through the first recognition unit of the smart watch with regard to icon arrangement.

The security functions of FIGS. 7 to 9 can also be applied to an icon for an application included in a user interface. Specifically, as one of the security functions, the user may give confidentiality to the icon in the user interface [S20a]. That is, the user may configure the smart watch 100 such that a prescribed authentication process is required when the smart watch 100 intends to launch a specific application. Giving confidentiality to an icon could be interpreted to mean that a function of the smart watch 100 related to the corresponding icon is limited for security reasons. FIG. 17 is a schematic diagram illustrating in detail steps for giving different levels of confidentiality to specific information according to the number of fingerprints authenticated through the first recognition unit of the smart watch with regard to icon arrangement.

First, as shown in FIG. 17(a), the smart watch 100 can provide the user interface including icons of applications through the display unit 15a. To limit access to and execution of an application, the user may select an icon of the corresponding application. To give confidentiality, whether the user can configure the security function should be first authenticated. To this end, as shown in the drawing, the user may place the user's index finger F1 on the first recognition unit 150 so that the smart watch 100 can recognize the user's fingerprint [S20]. In addition, the user may reduce or eliminate the icon of the corresponding application to prevent the application from being launched, and such an operation can be performed through the first recognition unit 150. Specifically, as shown in FIGS. 17(b) and 17(c), while the user swipes the first recognition unit 150 using a finger, e.g., the index finger F1, the fingerprint of the index finger F1 is recognized [S20] and then authenticated [S30]. If the recognized fingerprint is authenticated, the icon of the corresponding application may be reduced more or more as intended [S21 and S22] while the index finger F1 is swiped. In FIGS. 17(b) and 17(c), the fingerprint recognition/authentication and icon reduction can be simultaneously performed while the index finger F1 is swiped on the first recognition unit 150. That is, the smart watch 100 can recognize the user's fingerprint [S20] and at the same time, recognize the movement of the user's finger [S21]. Thereafter, the smart watch 100 can perform a prescribed operation based on the recognized movement [S22]. That is, since the smart watch 100 performs not only the user recognition but also the icon reduction, the user can use the smart watch 100 more conveniently. As shown in FIG. 17(d), if the fingerprint is authenticated, the smart watch can give confidentiality to the corresponding application [S40]. As an example of giving confidentiality, the icon of the selected application may be eliminated from the user interface. Thus, if the user is not authenticated, the selected application cannot be launched. The above-described steps may be repeatedly performed, and thus icons of a plurality of selected application may be eliminated from the user interface.

Figure 18:
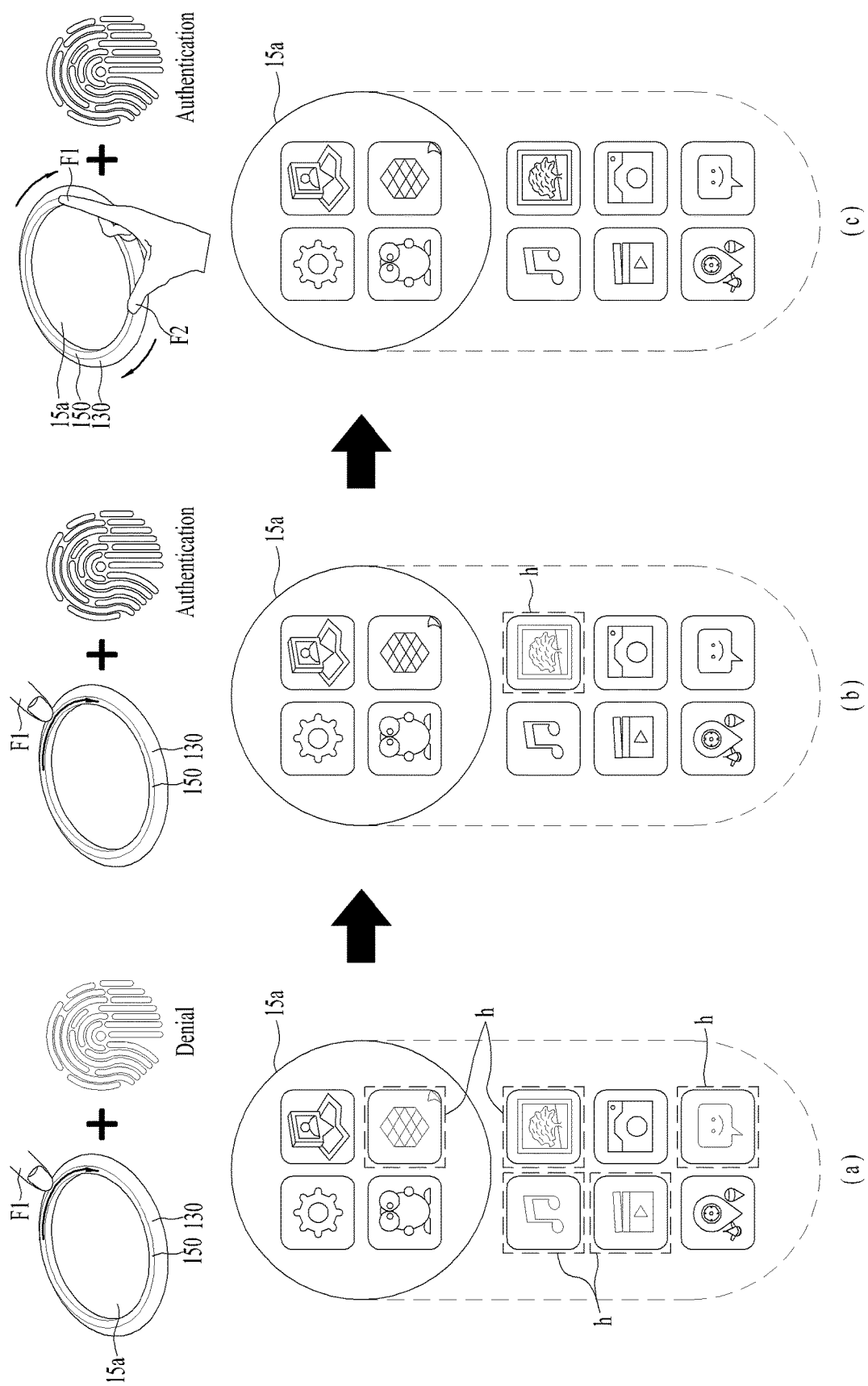
FIG. 18 is a schematic diagram illustrating in detail an example of steps for providing different ranges of information and operation according to the number of fingerprints authenticated through the first recognition unit of the smart watch with regard to icon arrangement.

In addition, as one of the security functions, in addition to giving of confidentiality, the smart watch 100 may request the user to authenticate a fingerprint to perform the application to which the confidentiality is given [S20b]. FIG. 18 is a schematic diagram illustrating in detail an example of steps for providing different ranges of information and operation according to the number of fingerprints authenticated through the first recognition unit of the smart watch with regard to icon arrangement.

Referring to FIG. 18(a), as described in the steps of FIG. 17, multiple icons h may be eliminated from the user interface due to the given confidentiality. Since the display unit 15a is small, only the icons in the circle are actually displayed on the display unit 15a. The remaining icons are included in the user interface, but they are not displayed on the display unit 15a. To launch applications connected to the hidden icons h, the smart watch 100 may request the user to recognize and authenticate a finger [S20 and S30]. As shown in FIG. 18(a), if the recognized fingerprint is not authenticated [S30], the icons h are not displayed on the user interface, and thus the applications connected to the icons h cannot be launched. If the recognized fingerprint is authenticated [S30], the icons h appear again on the user interface as shown in FIGS. 18(b) and (c), and the user may execute the corresponding applications using the restored icons h.

Further, the smart watch 100 may allow different ranges of applications to be launched for the user according to the number of authenticated fingerprints [S40b]. As shown in FIG. 18(b), if one fingerprint, e.g., the fingerprint of the index finger F1 is recognized and authenticated [S20 and S30], the smart watch 100 may hide an icon of an application that requires high security, for example, an icon h of a finance application due to a low authentication level. On the other hand, as shown in FIG. 18(c), if two fingerprints, e.g., the fingerprints of the index finger F1 and thumb F2 are recognized and authenticated [S20 and S30], the smart watch 100 may include icons of all applications in the user interface due to a relatively high authentication level.

Figure 19:
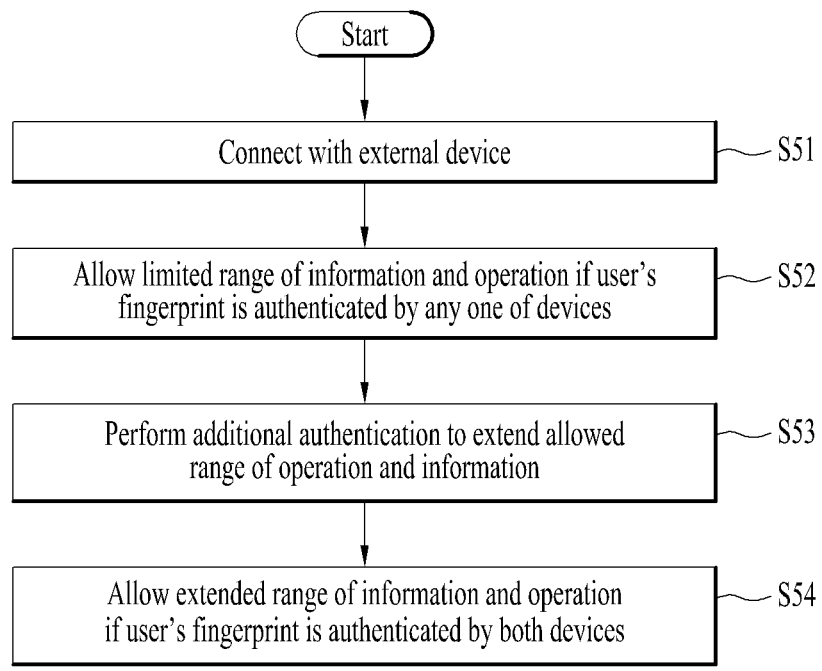
FIG. 19 is a flowchart illustrating a method for controlling the smart watch when the smart is connected to an external device.
Figure 20:
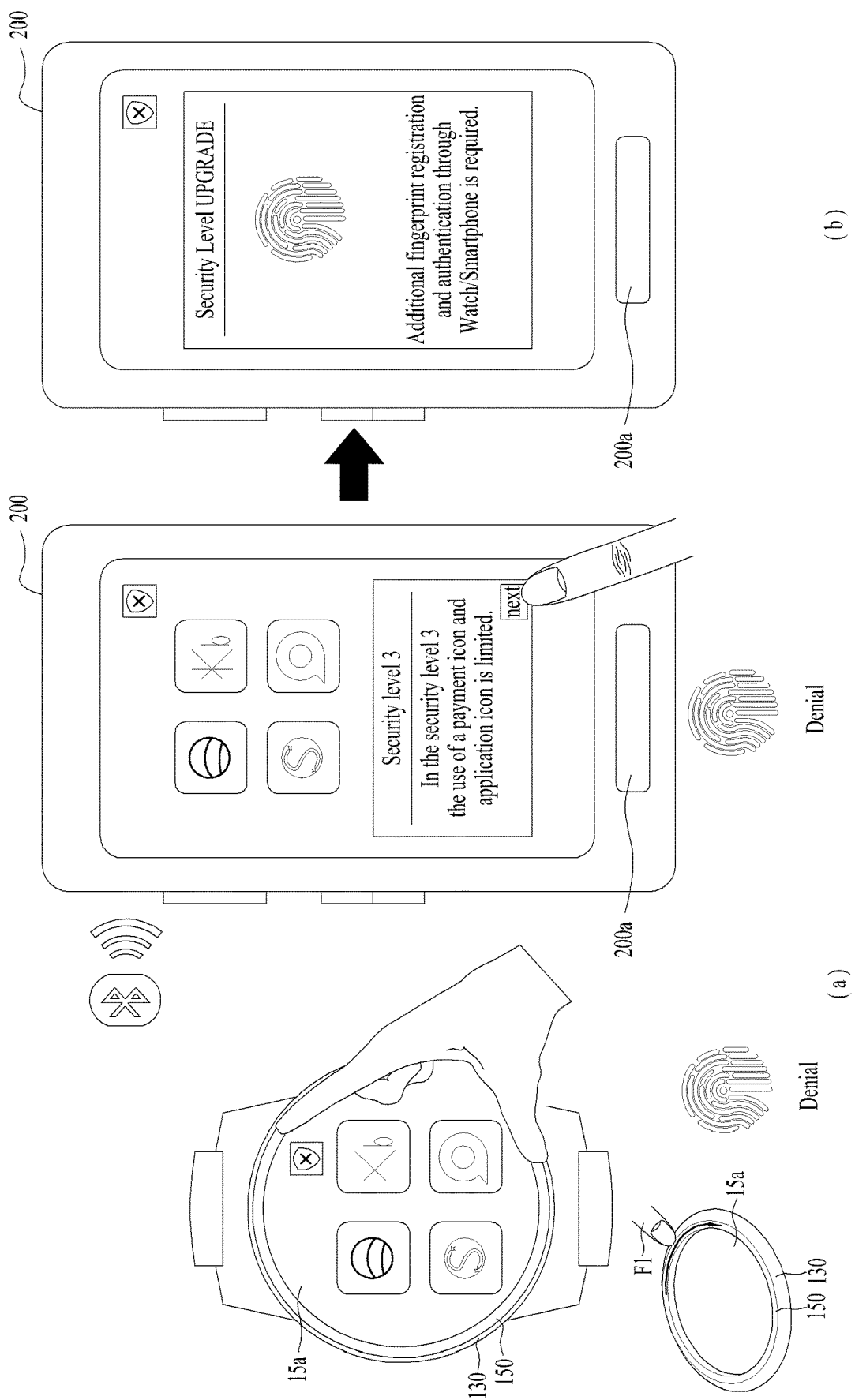
FIGS. 20 to 22 are schematic diagrams illustrating in detail examples of steps for providing different ranges of operation and information according to whether a fingerprint is authenticated through the first recognition unit of the smart watch and an external device when the smart watch is connected to the external device.
Figure 21:
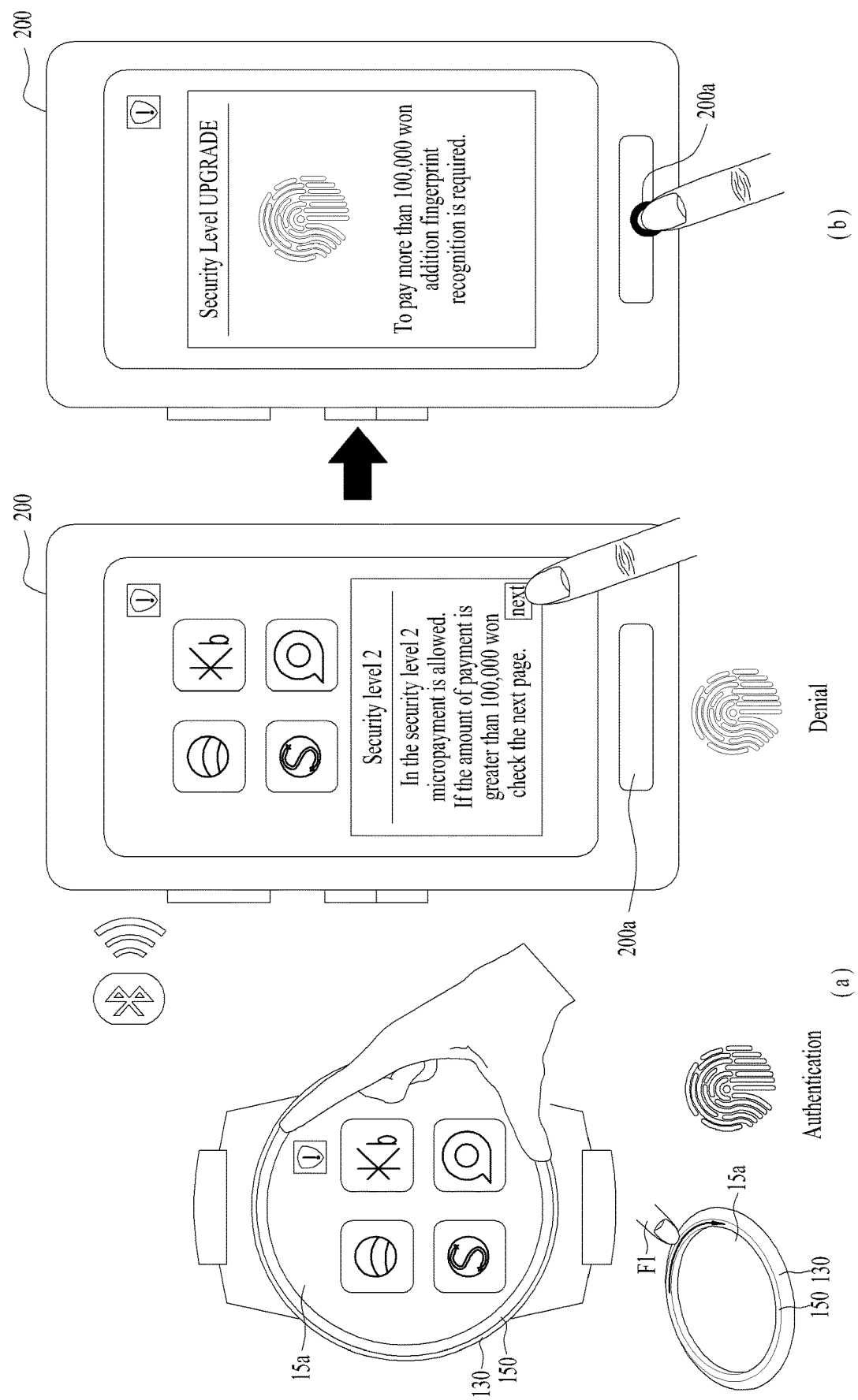
Figure 22:
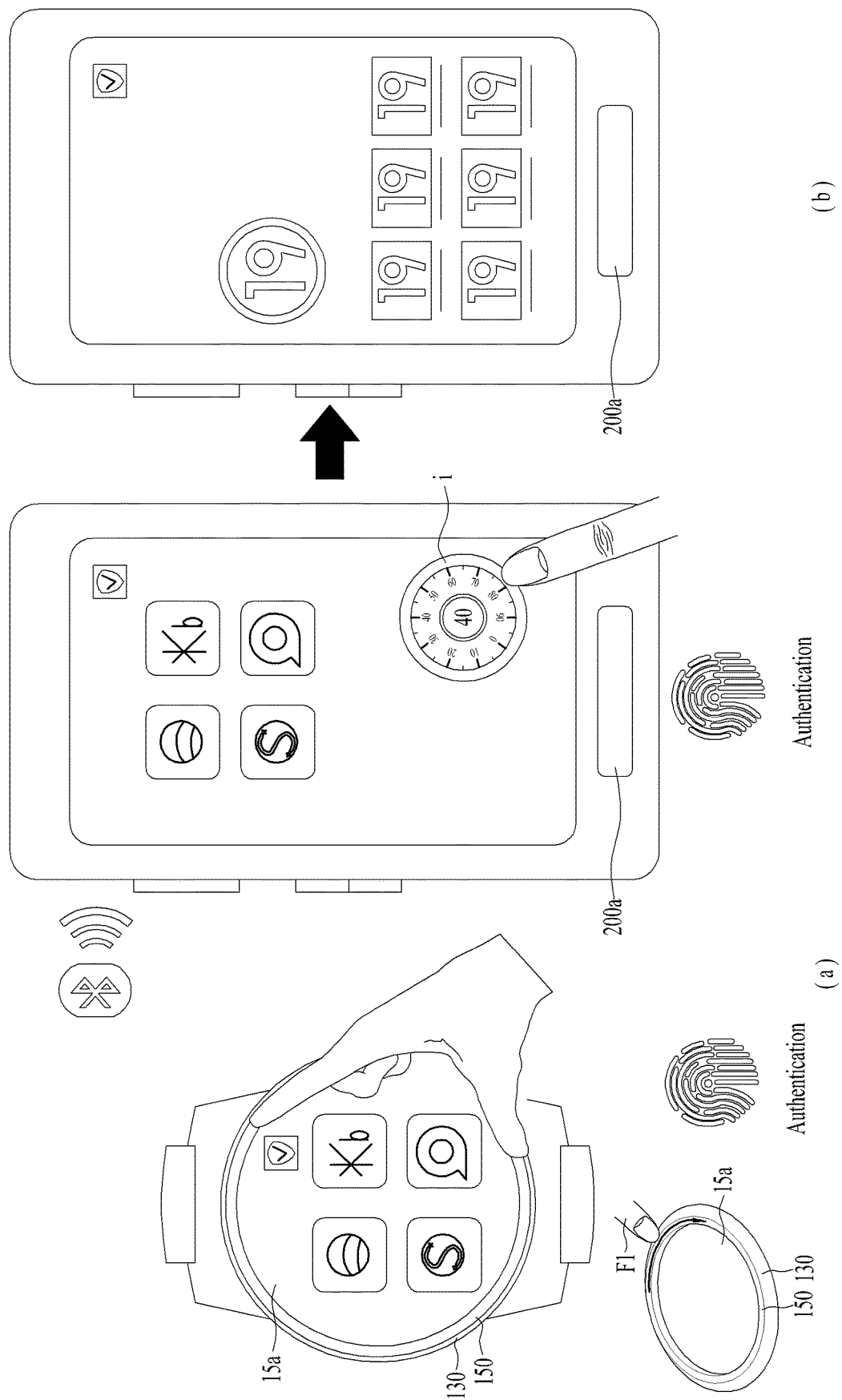

Meanwhile, the smart watch 100 is frequently connected to external devices and provides functions that the user desires. In this case, the security functions should be provided based on proper control methods. FIG. 19 is a flowchart illustrating a method for controlling the smart watch when the smart is connected to an external device. FIGS. 20 to 22 are schematic diagrams illustrating in detail examples of steps for providing different ranges of operation and information according to whether a fingerprint is authenticated through the first recognition unit of the smart watch and an external device when the smart watch is connected to the external device. Hereinafter, a control method for providing the security functions when the smart watch 100 is connected to an external device will be described in detail with reference to the drawings.

First, the smart watch 100 can be connected to an external device 200 for communication therebetween [S51]. In the connection step S51, the smart watch 100 can be connected to any external device with a communication function and information processing capability. For example, all types of smart devices and mobile terminals may be included in the external device 200. In addition, the smart watch 100 may use all types of communication methods to be connected to the external device 200. For example, as shown in FIG. 20(a), the smart watch 100 can communicate with the external device 200 using Bluetooth.

After the connection step S51, the smart watch 100 and external device 200 may request the user to recognize and authenticate a fingerprint to allow information and operation where security is required [S20]. As described above, the smart watch 100 may include the first recognition unit 150 for recognizing and authenticating a fingerprint. Referring to FIG. 20(a), the external device 200 may include a recognition unit 200a. As shown in FIG. 20(a), if the recognized fingerprint is not authenticated by any one of the smart watch 100 and external device 200 [S30], the smart watch 100 and external device 200 may refuse to perform an intended operation. That is, the user may not be allowed to access the information and operation where security is required. For example, as shown in the drawing, the user may not be allowed to execute a payment function or a specific application. In addition, for example, the external device 200 may request the user to register and recognize an additional fingerprint, and this request may also be displayed on the smart watch 100.

Meanwhile, if the user's fingerprint is authenticated by any one of the smart watch 100 and external device 200 in the authentication step [S30], a limited range of information and operation may be allowed for the user [S52]. Specifically, when the fingerprint is authenticated through either the smart watch 100 or the external device 200, the user may be allowed to access the information and operation in both of the smart watch 100 and external device 200, but the allowed operation and information may be limited due to a low authentication level. In addition, when the fingerprint is authenticated through one of the smart watch 100 and the external device 200, the recognized fingerprint may not be authenticated by the other, or the fingerprint recognition and authentication may not be performed by the other. For example, as shown in FIG. 21(a), when the fingerprint is recognized and authenticated through the first recognition unit 150 of the smartwatch 100 [S20 and S30], not only the smart watch 100 but also the external device 200 may be unlocked, and then a prescribed range of operation and information may be allowed for the user. In this case, the recognized fingerprint may be denied by the external device 200, or steps for the fingerprint recognition and authentication may not be performed by the external device 200. That is, when authentication is achieved by one of the two devices, it has a relatively low authentication level. Thus, although the smart watch 100 and external device 200 can launch normal applications including a finance application, the amount of payment that can be paid by the finance application may be limited. When the fingerprint recognition and authentication is performed through the recognition unit 200a of the external device 200, a limited range of operation and information is allowed for the user in the same manner.

To extend the allowed range of operation and information, an additional fingerprint authentication process may be performed by the other of the smart watch 100 and external device [S53]. That is, the other that has not performed the authentication process may perform the additional authentication fingerprint process. For example, as show in FIG. 21(b), if the amount of payment is greater than a predetermined amount, the external device 200 that has not performed the authentication process or denied the recognized fingerprint may request the user to additionally authenticate the fingerprint.

When the user's fingerprint is additionally authenticated by the other of the smart watch 100 and external device 200 in the recognition and authentication steps [S20 and S30], the allowed range of operation and information may be extended for the user [S54]. That is, when the fingerprint is authenticated by both of the smart watch 100 and external device 200, the user may use the extended range of information and operation. For example, as shown in FIG. 22(a), when the fingerprint is authenticated by both of the smart watch 100 and external device 200, the finance application can make a payment without limitation of the payment amount. In addition, as shown in FIG. 22(b), the user can access a folder including personal information. Further, a dial i for inputting a password can be additionally provided, and improved security can be provided for the personal information folder.

In the steps S51 to S54, the control method for the smart watch may be configured such that when the smart watch 100 is connected to the external device 200 for communication therebetween, the smart watch 100 and external device 200 allow the user to access different ranges of operation and information according to whether the user's fingerprint is authenticated by the smart watch 100 and external device 200. That is, depending on the checked authentication level, only the operation and information suitable for the authenticated level can be provided to the user. Therefore, when the smart watch 100 is connected to the external device 200, appropriate security can be provided to the user according to aforementioned control method.

Figure 23:
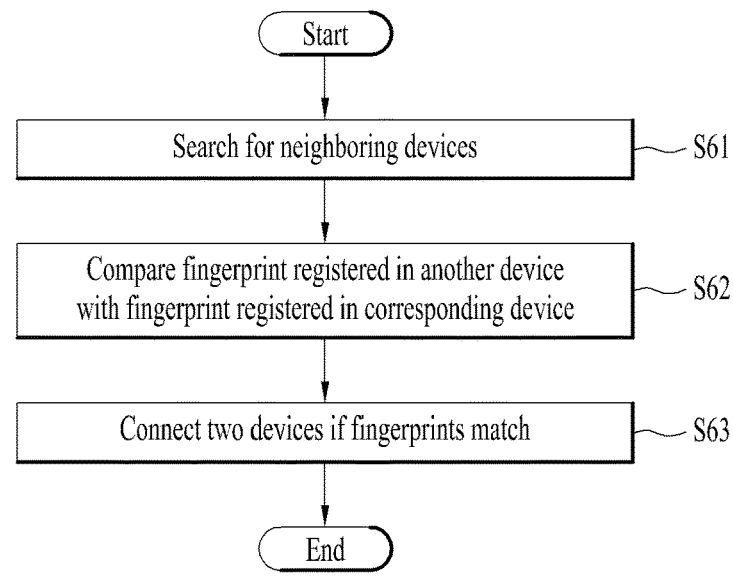
FIG. 23 is a flowchart illustrating steps for connecting the smart watch with an external device based on comparison of registered fingerprints.
Figure 24:
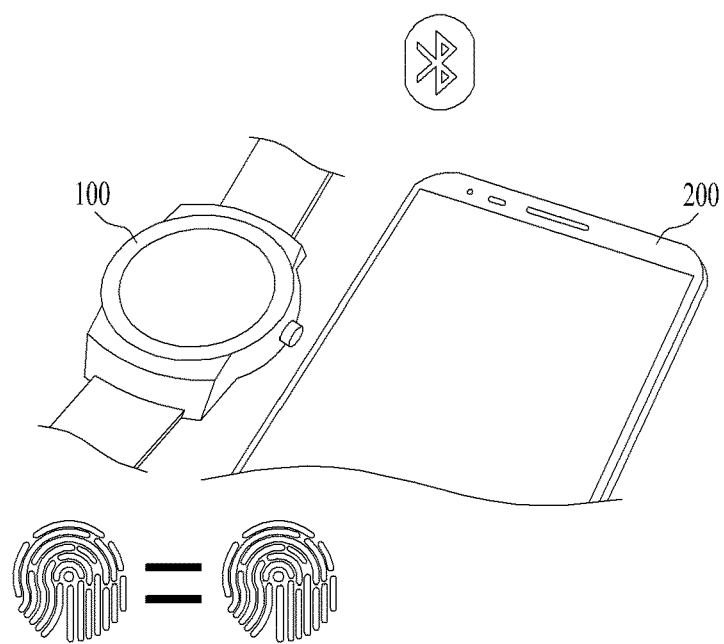
FIG. 24 is a schematic diagram illustrating in detail an example of steps for connecting the smart watch with an external device based on comparison of registered fingerprints.

Further, the connection step S51 may be easily performed using fingerprint information. FIG. 23 is a flowchart illustrating steps for connecting the smart watch with an external device based on comparison of registered fingerprints, and FIG. 24 is a schematic diagram illustrating in detail an example of steps for connecting the smart watch with an external device based on comparison of registered fingerprints.

First, for connection with other external devices, the smart watch 100 can search for external devices 200 that can be connected to the smart watch 100 [S61]. For example, as shown in FIG. 24, the smart watch 100 may search for a device that can perform Bluetooth communication for paring between Bluetooth devices. If the smart watch 100 discovers an external device 200 that can be connected, the smart watch 100 may check whether there is a registered fingerprint in the registration step S10. If the external device 200 has the registered fingerprint, the smart watch 100 can compare its registered fingerprint with the registered fingerprint of the external device 200 [S62]. If the registered fingerprints are equal to each other, the smart watch can be automatically connected to the external device 200 [S63]. In general, a complicated authentication process is required to connect the smart watch 100 to the external device 200. However, when the registered fingerprints are the same, the smart watch 100 can be immediately connected to the external device 200 through the authentication steps S61 to S63 where the fingerprints are used, and thus the user can use the smart watch 100 more conveniently.

In addition to the aforementioned actual examples related to the first recognition unit 150, actual examples related to the second recognition unit disposed on the crown 140 will be described. Although similar to the actual examples of the first recognition unit 150, the actual examples of the second recognition unit 160 are based on the common and conceptual control methods described with reference to FIGS. 7 to 9, additional embodiments extended from the conceptual control methods of FIGS. 7 to 9 will also be described. In addition, similar to the first recognition unit 150, the second recognition unit 160 can simultaneously recognize and authenticate a plurality of different fingerprints. However, considering that the crown 140 is a very small component, the recognition area of the second recognition unit 160 is relatively smaller than that of the first recognition unit 150. Thus, the second recognition unit 160 may be used more efficiently in recognizing and authenticating a single fingerprint rather than multiple fingerprints. For this reason, it is assumed in the actual examples related to the second recognition unit 160 that a single fingerprint is recognized and authenticated. However, since the second recognition unit 160 can recognize and authenticate multiple fingerprints, the above-described actual examples of the first recognition unit 150 where multiple fingerprints are recognized and authenticated can be equally applied to the second recognition unit 160. Further, although not described in this document, the actual examples of the second recognition unit 160, which will be described later, can be equally applied to the first recognition unit 150. Similarly, the above-described actual examples of the first recognition unit 150 can be equally applied to the second recognition unit 160.

As the security functions described with reference to FIGS. 7 to 9, the user may give confidentiality to a user interface of the smart watch 100 [S20*a*]. In detail, the smart watch 100 may be configured such that different user interfaces are provided according to whether a fingerprint is authenticated. FIG. 27 is a schematic diagram illustrating in detail steps for providing a different user interface according to whether a fingerprint is authenticated through the second recognition unit.

First, as shown in FIG. 27(*a*), the smart watch 100 can provide a user interface including icons of applications through the display unit 15*a*. Specifically, the user interface shown in FIG. 27(*a*) is configured to perform normal functions where security is not required, and thus the user interface includes icons of applications where security is not required. The user interface of FIG. 27(*a*) can be called an interface in normal mode in consideration of non-security of the executable functions. The normal mode can be provided as an initial screen when the smart watch 100 first operates. In addition, if the user does not perform the fingerprint recognition and authentication using the second recognition unit 160 [S20 and S30], an interface in accordance with the normal mode can be provided. Similarly, when a fingerprint is recognized by the second recognition unit 160 [S20] but it is not authenticated [S30], the smart watch may provide the normal mode.

Meanwhile, as shown in FIG. 27(*b*), if the fingerprint is recognized and authenticated through the second recognition unit 160 [S20 and S30], the smart watch 100 may execute a user interface capable of performing a function where security is required [S40]. The interface of FIG. 27(*b*) may include applications where security is required, for example, applications for providing a function of accessing personal information of the user and icons thereof. Compared to the interface of FIG. 27(*a*), the interface of FIG. 27(*b*) can be called an interface in security mode. To provide security, the user may pre-configure a specific function in the normal mode to be operated in the security mode. Similarly, if necessary, the user may configure specific information or applications/icons in the normal mode to be operated in the security mode. A process for switching a specific item of the normal mode to the security mode will be described in detail with reference to FIG. 32.

Depending on whether the fingerprint is authenticated in the steps of FIG. 27, the smart watch 100 can provide different user interfaces to the user. Thus, the user may use the improved security function more conveniently.

Figure 28:
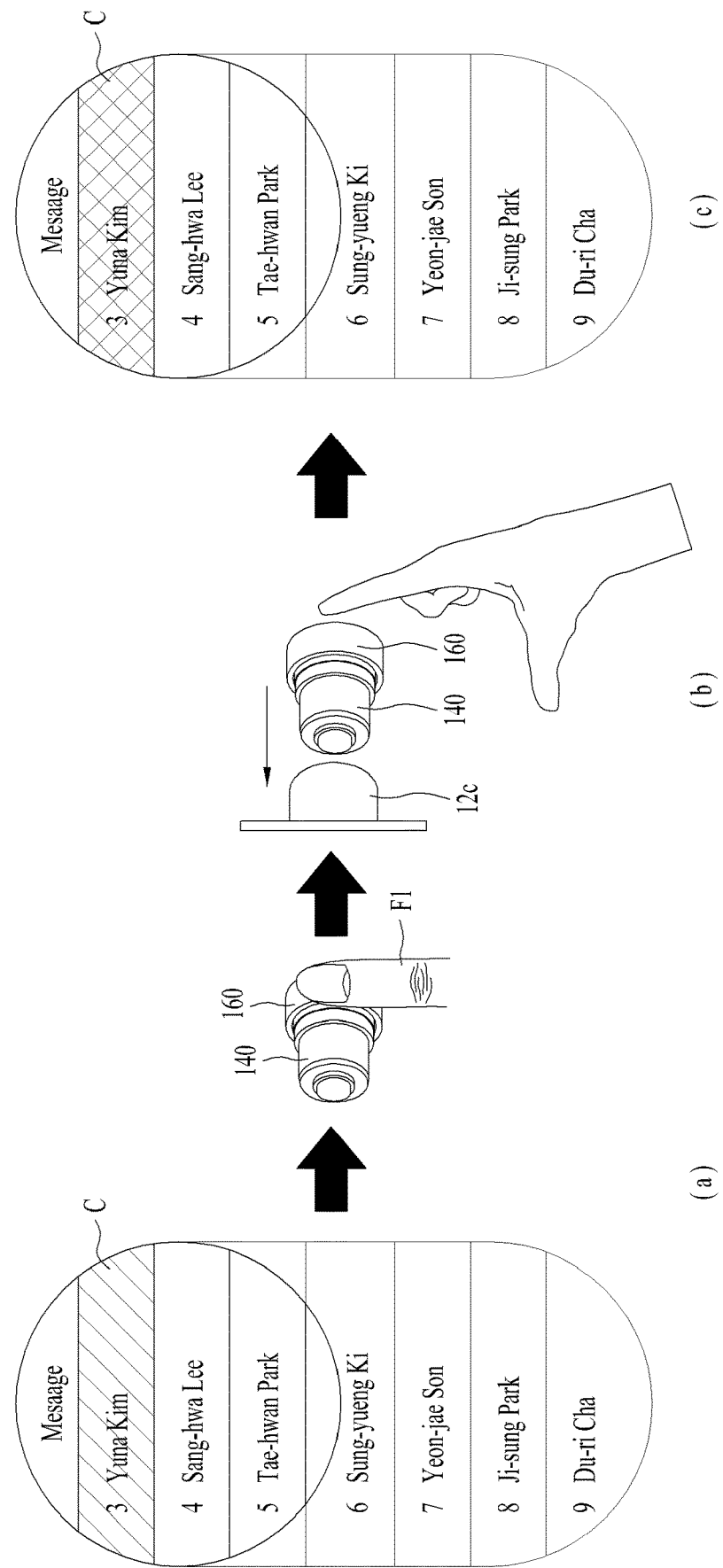
FIG. 28 is a schematic diagram illustrating in detail steps for giving confidentiality to specific information according to a fingerprint authenticated through the second recognition unit of the smart watch in reference to a text message.

As described above with reference to the actual example of the first recognition unit 150, since a text message may include important information of the user, the security functions in accordance with the control methods of FIGS. 7 to 9 may be provided using the second recognition unit 160. First, the user may give prescribed confidentiality to information related to a text message provided by the smart watch 100 [S20*a*]. That is, the user may configure the smart watch 100 such that a prescribed authentication process is required when the smart watch 100 intends to access a message received from a specific person. FIG. 28 is a schematic diagram illustrating in detail steps for giving confidentiality to specific information according to a fingerprint authenticated through the second recognition unit of the smart watch in reference to a text message.

First, as shown in FIG. 28(*a*), the smart watch 100 can provide a message list to the user through the display unit 15*a*. The list may be arranged according to names of senders and include a name of a specific person c to which the user desires to give confidentiality. To give confidentiality, whether the user can configure the security function should be first authenticated. To this end, as shown in the drawing, the user may place the user's index finger F1 on the second recognition unit 160 so that the smart watch 100 can recognize the user's fingerprint [S20]. In addition, the user may scroll the message list to select the specific person c, and scrolling may be performed on the second recognition unit 160 as shown in the drawing. Specifically, in FIG. 28(*a*), when the user swipes the second recognition unit 160 using the index finger F1, the fingerprint recognition and scrolling can be simultaneously performed. The smart watch 100 can recognize the user's fingerprint [S20] and at the same time, recognize the movement of the user's finger [S21]. Thereafter, the smart watch 100 can perform a prescribed operation based on the recognized movement [S22]. That is, since the smart watch 100 performs not only the user recognition but also scrolling while the user swipes to scroll the list, the user can use the smart watch 100 more conveniently.

When the recognized fingerprint is authenticated in comparison with the registered fingerprint [S30], the user may select the scrolled specific person c by pushing the crown 140 as shown in FIG. 28(*b*). When the crown 140 is pushed, a switch 12*c* adjacent to the crown 140 of the smart watch 100 is pushed, and an electrical signal for selecting the specific person c may be transmitted to the circuit board 13 and control unit 18. Meanwhile, the selection through the crown 140 may be first perform, and then the recognized fingerprint may be authenticated [S30]. When the user is authenticated through the authentication, the smart watch 100 can give confidentiality to the specific person c and the message therefrom [S40] as shown in FIG. 28(*c*). As an example of giving confidentiality, the name of the specific person c to which the confidentiality is given through the steps of FIG. 28 may be hidden from the list to prevent an authorized user from seeing the name as shown in FIG. 29.

As one of the security functions for text messages, in addition to giving of confidentiality, the smart watch 100 may request the user to authenticate a fingerprint to access a specific text message or perform a related operation [S20*b*]. FIGS. 29 and 30 are schematic diagrams illustrating in detail examples of steps for providing different ranges of information and operation according to a fingerprint authenticated through the second recognition unit of the smart watch in reference to a text message.

As described in the steps of FIG. 28, the name of the specific person c is hidden from the list due to the given confidentiality. To access information on the hidden specific person c, the smart watch 100 may request the user to recognize and authenticate the user's fingerprint [S20 and S30]. As shown in FIG. 29(*a*), if the recognized fingerprint is not authenticated through the second recognition unit 160 [S30], the intended operation may be refused by the smart watch 100. In other words, the name of the specific person c and the message therefrom may not be shown still. On the contrary, as shown in FIG. 29(*b*), if the recognized fingerprint is authenticated through the second recognition unit 160 [S30], the name of the specific person c is included in the list, and the user can check the message from the specific person c by selecting the name of the specific person c [S40].

Figure 29:
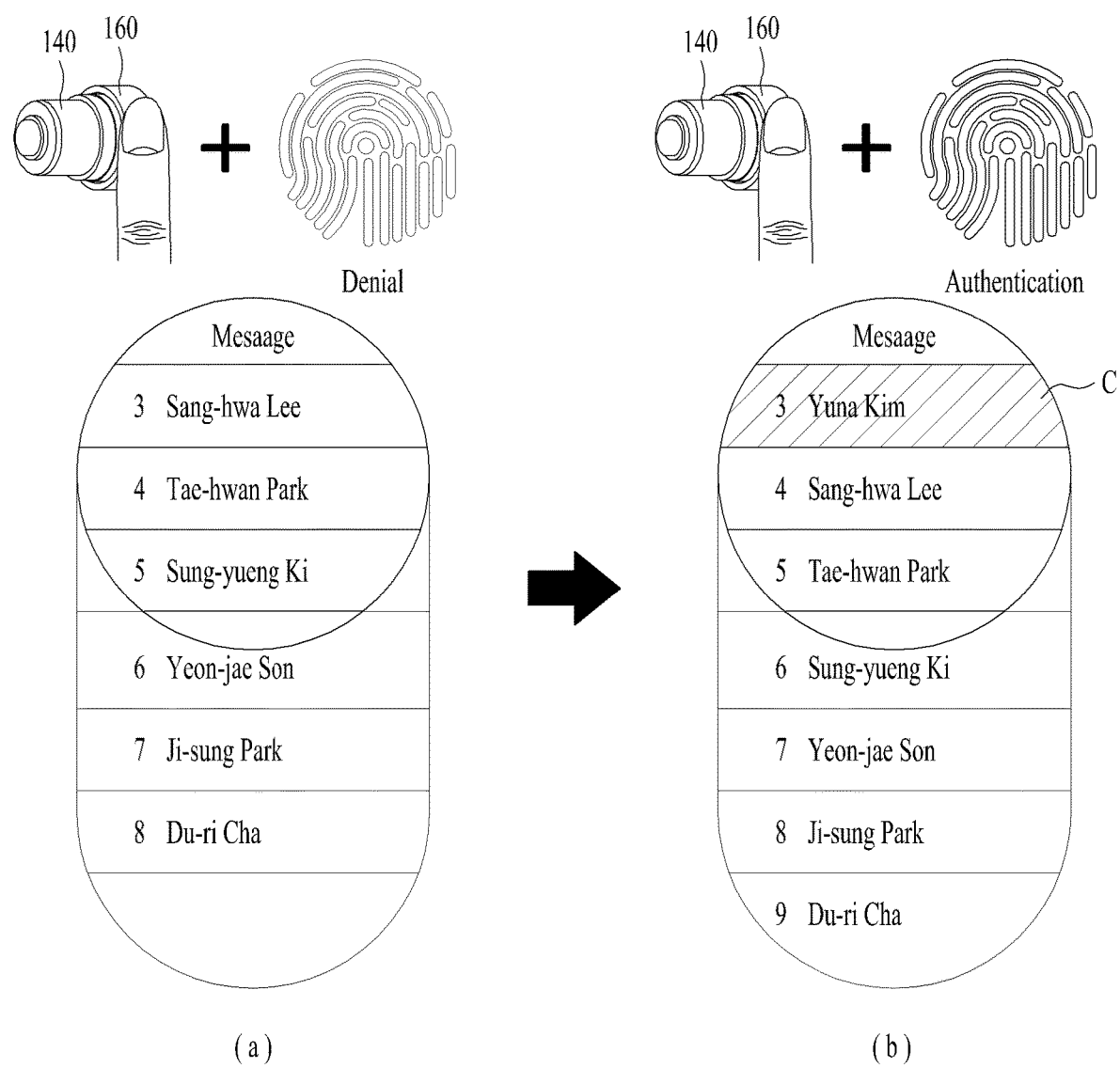

In addition, as shown in FIGS. 29(*b*) and 30(*a*), if the fingerprint is authenticated [S30], the smart device 100 can display the hidden name of the specific person c on the list. Further, as shown in FIG. 30(*b*), if the fingerprint is authenticated through the second recognition unit 160 [S30], the hidden name of the specific person c appears in the list, and at the same time, a part of the message from the specific person c may be displayed. That is, if the fingerprint is authenticated [S30], the amount of information provided to the user can be adjusted, and the adjustment can be pre-configured by the user.

Figure 31:
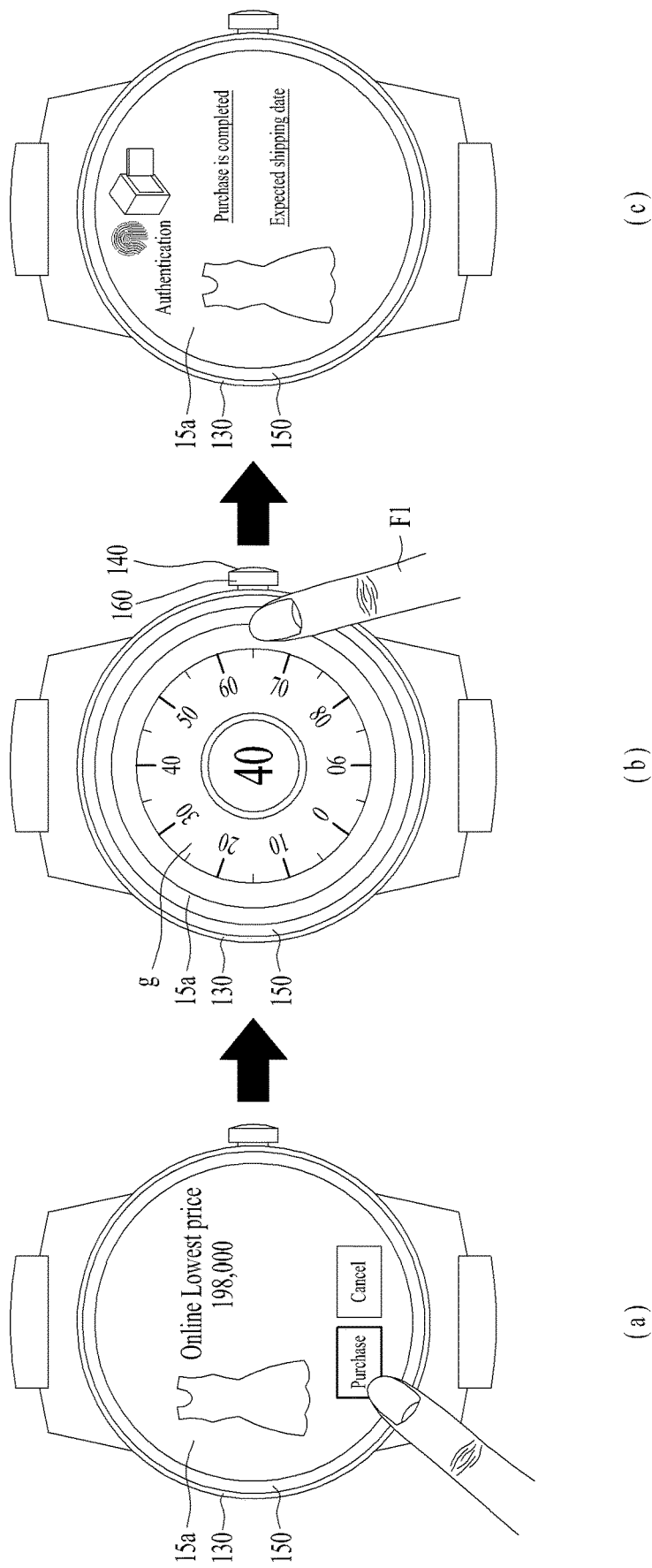
FIG. 31 is a schematic diagram illustrating in detail an example of steps for providing different ranges of information and operation according to a fingerprint authenticated through the second recognition unit of the smart watch with regard to mobile payment.

In addition to the aforementioned actual example related to text messages, the security functions of FIGS. 7 to 9 can be applied to mobile payment using the second recognition unit 160. The smart watch 100 may request the user to recognize and authenticate a fingerprint to perform operations related to payment using credit information [S20b]. FIG. 31 is a schematic diagram illustrating in detail an example of steps for providing different ranges of information and operation according to a fingerprint authenticated through the second recognition unit of the smart watch with regard to mobile payment.

As shown in FIG. 31(a), the smart watch 100 can provide a prescribed purchase interface to the user, and the user may request purchase of a desired product by touching, for example, a "purchase" button. Thereafter, the smart watch 100 may request the user to recognize and authenticate a fingerprint for the purchase request [S20]. As shown in FIG. 31(b), the payment interface may provide a virtual dial g, and to provide an improved payment security function, both the fingerprint authentication and a preconfigured password may be required. Using the interface shown in FIG. 31(b), the user may conveniently and simultaneously perform the fingerprint recognition [S20] and the finger movement recognition/operation instruction [S21 and S22]. Specifically, for the fingerprint recognition, the user may swipe the second recognition unit 160 using fingers, e.g., the index finger F1 and thumb F2 [S20]. At the same time, the user may swipe the second recognition unit 160 using the index finger F1 and thumb F2 to rotate the virtual dial g [S21 and S22]. While the user performs swiping, the smart watch 100 may recognize the user's fingerprints and the movements of the fingers [S20 and S21] and rotate the dial g to input the password based on the recognized movements. As shown in FIG. 31(c), if the recognized fingerprints are authenticated [S30] and the password is exactly inputted, the smart watch 100 may make a payment using stored credit information [S40]. As shown in the interface of FIG. 16(c), the smart watch 100 may show the user a message saying that the payment is completed and an icon or image showing success of the fingerprint recognition and password input.

Figure 32:
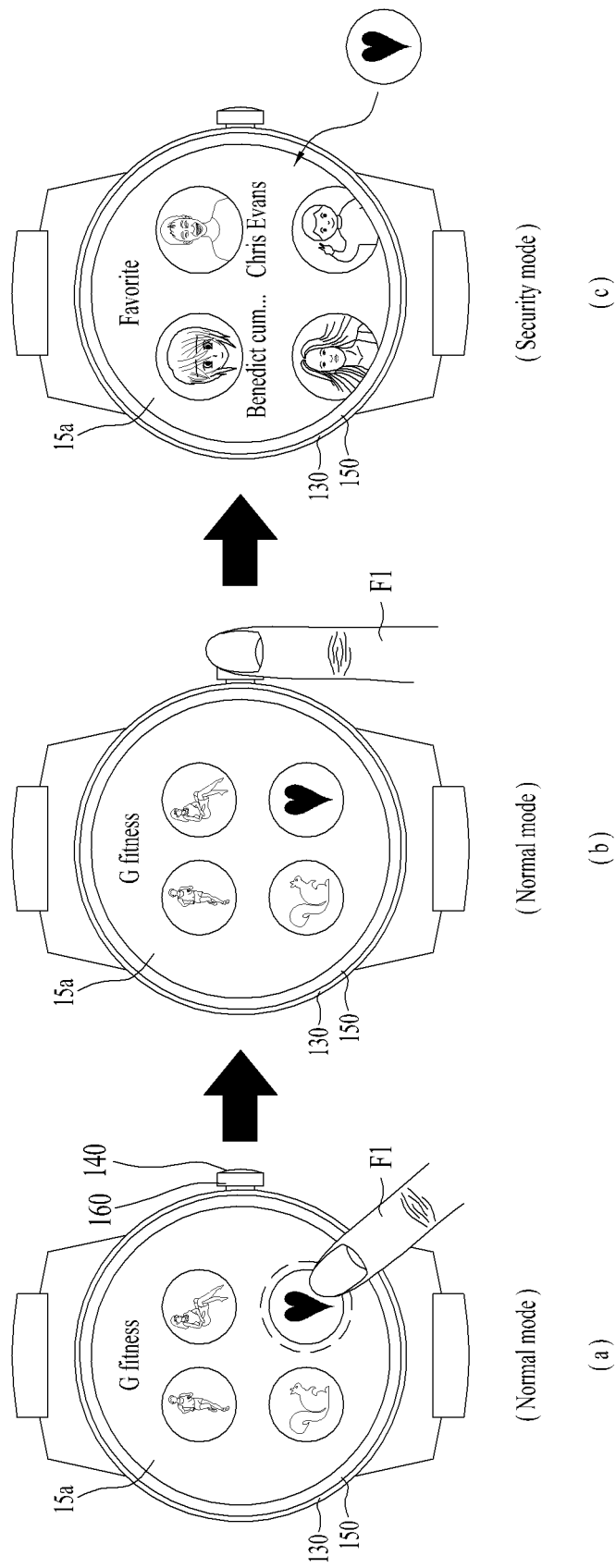
FIG. 32 is a schematic diagram illustrating in detail steps for giving confidentiality to specific information according to a fingerprint authenticated through the second recognition unit of the smart watch with regard to icon arrangement.

In addition to giving confidentiality to the user interface of FIG. 27, the security functions of FIGS. 7 to 9 can also be applied to an icon for an application included in the user interface. Specifically, the user may give confidentiality to an icon in the user interface of the smart watch 100 using the second recognition unit 160 [S20a]. That is, the user may configure the smart watch 100 such that a prescribed authentication process is required when the smart watch 100 intends to launch a specific application. FIG. 32 is a schematic diagram illustrating in detail steps for giving confidentiality to specific information according to a fingerprint authenticated through the second recognition unit of the smart watch with regard to icon arrangement.

First, as shown in FIG. 32(a), the smart watch 100 can provide the user interface including icons of applications through the display unit 15a. The user interface of FIG. 32(a) provides functions and applications where security is not required, and thus it corresponds to the normal mode as described with reference to FIG. 27. To limit access to and execution of an application, the user may select an icon of the corresponding application. To give confidentiality, whether the user can configure the security function should be first authenticated. To this end, as shown in FIG. 32(b), the user may place the user's index finger F1 on the second recognition unit 160 so that the smart watch 100 can recognize the user's fingerprint [S20]. In addition, at the same time, the user may eliminate the icon of the corresponding application from the normal mode to provide security to the application, i.e., to prevent the application from being launched, and such an operation can be performed through the second recognition unit 160. Specifically, as shown in FIG. 32(b), while the user swipes the second recognition unit 160 using a finger, e.g., the index finger F1, the fingerprint of the index finger F1 is recognized [S20] and then authenticated [S30]. If the recognized fingerprint is authenticated, the icon of the corresponding application may be eliminated from the normal mode as intended [S21 and S22] while the index finger F1 is swiped on the second recognition unit 160. In FIG. 32(b), the fingerprint recognition/authentication and icon reduction (elimination) can be simultaneously performed while the index finger F1 is swiped on the second recognition unit 160. That is, the smart watch 100 can recognize the user's fingerprint [S20] and at the same time, recognize the movement of the user's finger [S21]. Thereafter, the smart watch 100 can perform a prescribed operation based on the recognized movement [S22]. That is, since the smart watch 100 performs not only the user recognition but also the icon elimination, the user can use the smart watch 100 more conveniently. As shown in FIG. 32(c), if the fingerprint is authenticated, the smart watch can give confidentiality to the corresponding application [S40]. As an example of giving confidentiality, the icon of the selected application is eliminated from the normal mode, and at the same time, it can be included in the user interface operating in the security mode as shown in the drawing. Thus, if the user is not authenticated, the selected application cannot be launched. The above-described steps may be repeatedly performed, and thus icons of a plurality of selected application may be eliminated from the normal mode and then included in the security mode.

Figure 33:
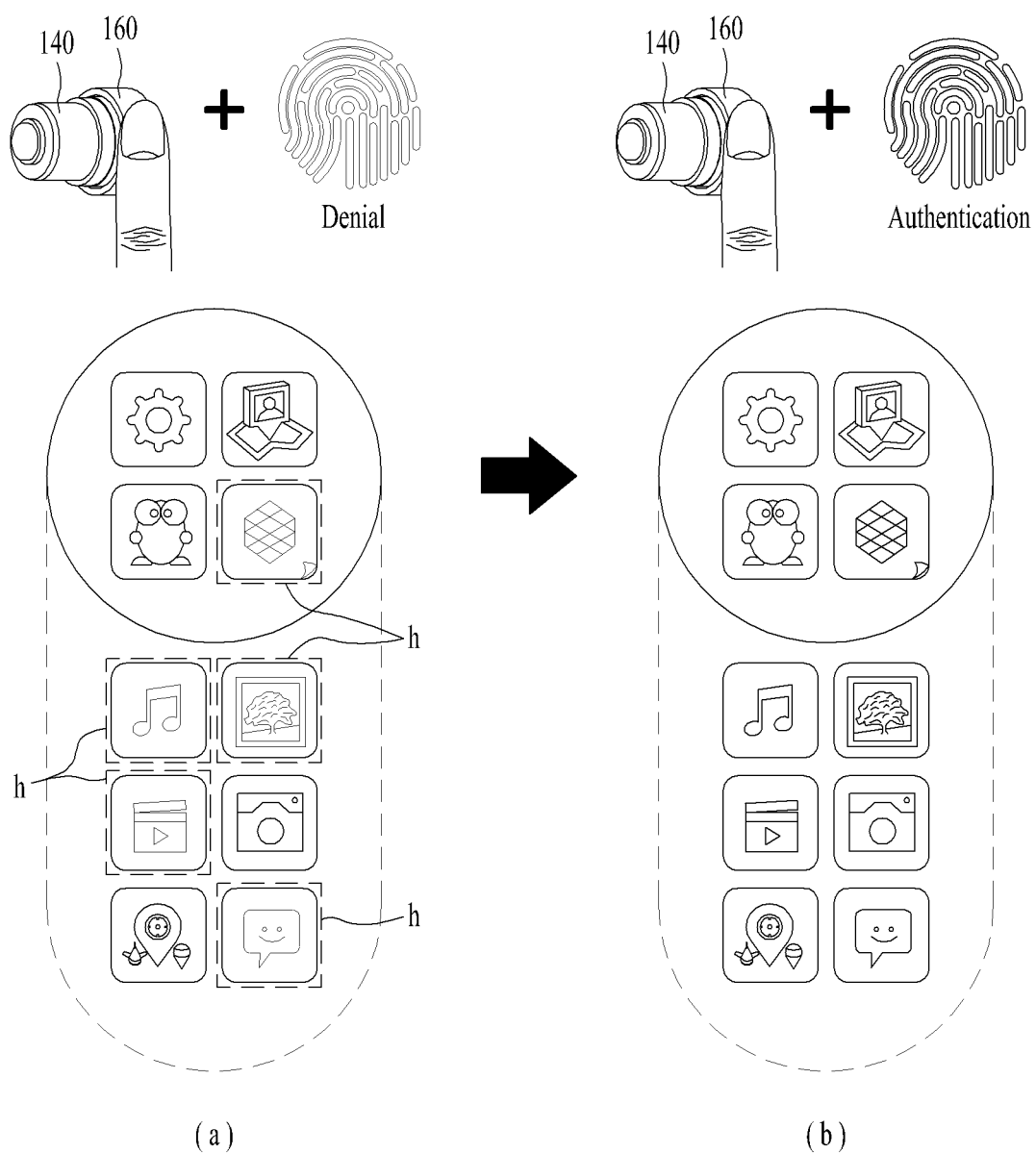
FIG. 33 is a schematic diagram illustrating in detail an example of steps for providing different ranges of information and operation according to a fingerprint authenticated through the second recognition unit of the smart watch with regard to icon arrangement.

In addition, as one of the security functions, the smart watch 100 may request the user to authenticate a fingerprint to launch a specific application, i.e., an application to which confidentiality is given [S20b]. FIG. 33 is a schematic diagram illustrating in detail an example of steps for providing different ranges of information and operation according to a fingerprint authenticated through the second recognition unit of the smart watch with regard to icon arrangement.

Referring to FIG. 33(a), similar to the steps of FIG. 32, multiple icons h may be eliminated from the user interface due to the given confidentiality. The icons eliminated in the steps of FIG. 32 are included in the user interface operating in the security mode, whereas the icons h of FIG. 33(a) are simply hidden from the current user interface, that is, they may be actually present in the current interface. Since the display unit 15a is small, only the icons in the circle are actually displayed on the display unit 15a. The remaining icons are included in the user interface, but they are not displayed on the display unit 15a. To launch applications connected to the hidden icons h, the smart watch 100 may request the user to recognize and authenticate a finger [S20 and S30]. As shown in FIG. 33(a), if the recognized fingerprint is not authenticated through the second recognition unit 160 [S30], the icons h are not displayed on the user interface, and thus the applications connected to the icons h cannot be launched. If the recognized fingerprint is authenticated

[S30], the icons h appear again on the user interface as shown in FIG. 33(b), and the user may execute the corresponding applications using the restored icons h.

Figure 34:
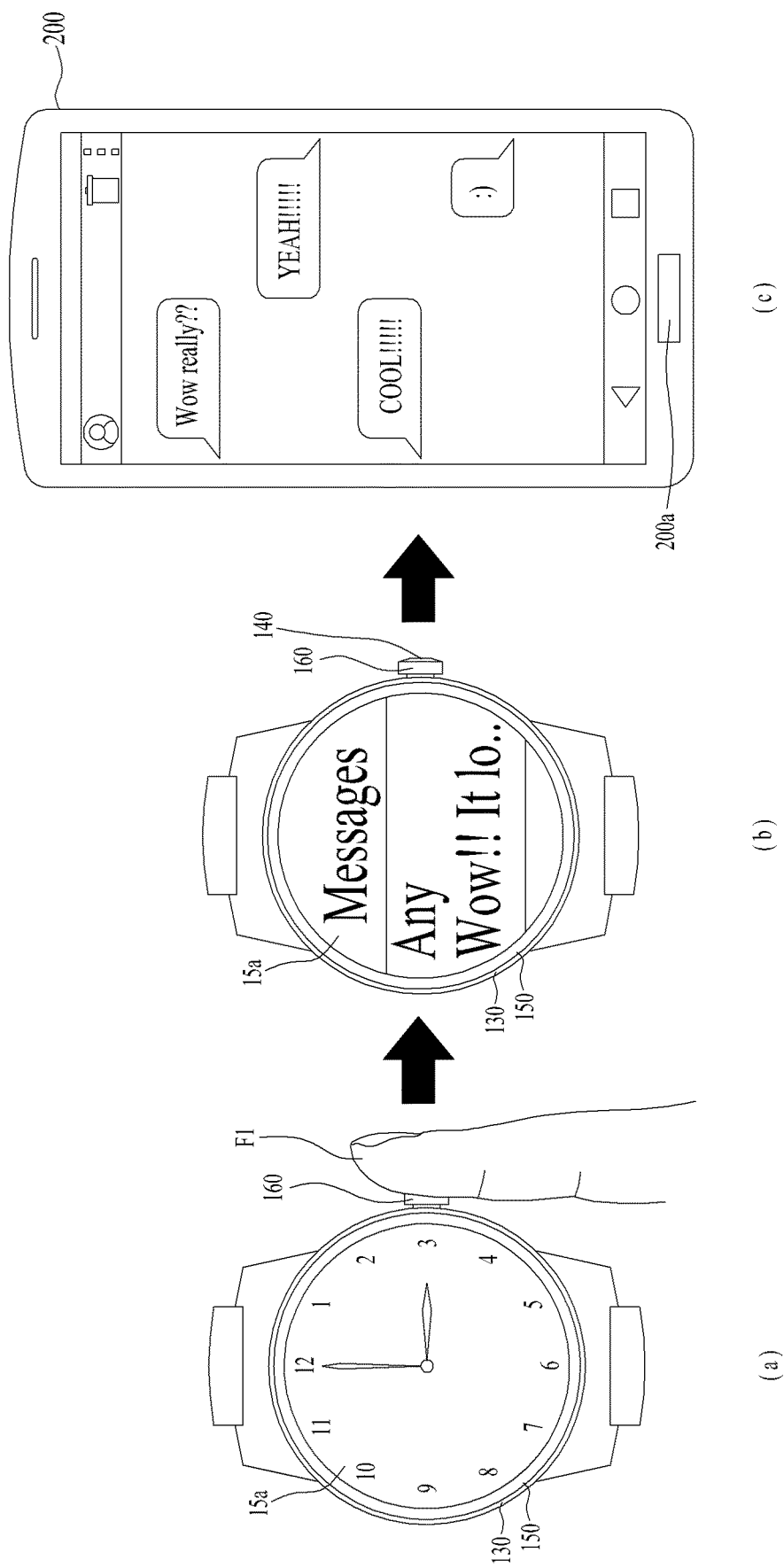

Meanwhile, when the smart watch 100 is connected to external devices, the security functions should be provided based on proper control methods. FIGS. 34 and 35 are schematic diagrams illustrating in detail examples of steps for providing different ranges of operation and information according to whether a fingerprint is authenticated through the smart watch and an external device when the smart watch is connected to the external device.

First, using one of various methods, the smart watch 100 can be connected to an external device 200 for communication therebetween. After establishment of the connection, the smart watch 100 and external device 200 may request the user to recognize and authenticate a fingerprint to allow information and operation where security is required. As described above, the smart watch 100 may include the second recognition unit 160 for recognizing and authenticating a fingerprint, and the external device 200 may include a recognition unit 200a. If the recognized fingerprint is not authenticated by any one of the smart watch 100 and external device 200 [S30], the smart watch 100 and external device 200 may refuse to perform an intended operation. That is, the user may not be allowed to access the information and operation where security is required. For example, as shown in the drawing, the user may not be allowed to access a text message.

Meanwhile, if the user's fingerprint is authenticated by any one of the smart watch 100 and external device 200 [S30], a limited range of information and operation may be allowed for the user. Specifically, when the fingerprint is authenticated through either the smart watch 100 or the external device 200, the user may be allowed to access the information and operation in both of the smart watch 100 and external device 200, but the allowed operation and information may be limited due to a low authentication level. For example, as shown in FIG. 34(a), if the smart watch 100 recognizes and authenticates the fingerprint through the second recognition unit 160 [S20 and S30], not only the smart watch 100 but also the external device 200 are unlocked, and then prescribed range of operation and information may be allowed for the user. For example, if the fingerprint is authenticated as shown in FIG. 34(a) [S30], the user may access a text message as shown in FIG. 34(b) because the text message has a relatively low security level. At the same time, as shown in FIG. 34(c), the external device 200 may allow the user to access the text message based on the authentication in the smart watch 100. Considering that when authentication is achieved by one of the two devices, it has a relatively low authentication level, the smart watch 100 and external device 200 can launch or access, for example, normal applications and text messages but execution of a finance application may be limited. When the fingerprint recognition and authentication is performed only through the recognition unit 200a of the external device 200, a limited range of operation and information is allowed for the user in the same manner.

To extend the allowed range of operation and information, an additional fingerprint authentication process may be performed by the other of the smart watch 100 and external device [S30]. That is, the other that has not performed the authentication process may perform the additional authentication fingerprint process. For example, as show in FIG. 35, when the user intends to make a payment using the finance application, the external device may request the user to additionally authenticate the fingerprint.

When the user's fingerprint is additionally authenticated by the other of the smart watch 100 and external device 200 in the recognition and authentication steps [S20 and S30], the allowed range of operation and information may be extended for the user. That is, as shown in FIGS. 35(a) and 35(b), when the fingerprint is authenticated by both of the smart watch 100 and external device 200, the user may use the extended range of information and operation. For example, as shown in FIGS. 35(a) and 35(b), when the fingerprint is authenticated by both of the smart watch 100 and external device 200, the user can make a payment using the finance application. In addition, to enhance the security, the user may additionally input a password using the smart watch 100 or external device 200 as shown in FIG. 35(c). Further, instead of or besides the password, user's voice may be recognized and authenticated.

Meanwhile, referring to FIGS. 23 and 24, fingerprints of the same user may be previously registered in both of the smart watch 100 and external device 200, and the smart watch 100 and external device 200 may be connected to each other by checking that the registered fingerprints are the same. In this case, as shown in FIG. 34(a), if the smart watch 100 recognizes and authenticates a fingerprint through the second recognition unit 160 [S20 and S30], it could be interpreted as additional fingerprint authentication different from the fingerprint authentication for the connection, and thus it can be considered to have a relatively high authentication level. Therefore, in this case, even if the authentication is achieved through any one of the smart watch 100 and external device 200, the extended range of operation and information mentioned with reference to FIG. 35 can be allowed for the user.

The above descriptions are to be considered in all respects as illustrative and not restrictive. The scope of the invention should be determined by reasonable interpretation of the appended claims and all change which comes within the equivalent scope of the invention are included in the scope of the invention.

What is claimed is:

1. A smart watch, comprising:
   a case;
   a display provided on the case and configured to output visual content;
   a fingerprint sensor configured to simultaneously detect one or more fingerprints associated with a user; and
   control circuitry configured to control operation of the smart watch based on a quantity of the fingerprints detected by the fingerprint sensor that correspond to stored fingerprints, wherein the control circuitry, when controlling operation of the smart watch, is further configured to:
      control the display to output first content and second content when two or more of the fingerprints detected by the fingerprint sensor correspond, respectively, to the stored fingerprints,
      control the display to output only the first content and not the second content when only one of the fingerprints detected by the fingerprint sensor corresponds to the stored fingerprints, and
      control the display to not output the first content or the second content when the none of the fingerprints detected by the fingerprint sensor correspond to the stored fingerprints, and
   wherein the control circuitry, when controlling operation of the smart watch based on the quantity of the fingerprints detected by the fingerprint sensor that correspond to the stored fingerprints, is further configured to:

control the display to output a first graphical symbol associated with performing a first operation when one of the fingerprints detected by the fingerprint sensor corresponds to the stored fingerprints; and control the display to concurrently output the first graphical symbol and a second graphical symbol associated with performing a second operation when two or more of the fingerprints detected by the fingerprint sensor correspond, respectively, to the stored fingerprints.

2. The smart watch of claim 1, further comprising:
a bezel provided on the case and configured to enclose the display, wherein the fingerprint sensor is provided on the bezel.

3. The smart watch of claim 2, wherein the fingerprint sensor is continuously formed along the bezel in the form of a rim enclosing the display.

4. The smart watch of claim 1, wherein the fingerprint sensor is configured to check whether an object in contact with the fingerprint sensor is a human finger by comparing a constant voltage change pattern detected when the object contacts the fingerprint sensor with a predetermined pattern associated with a human finger contacting the fingerprint sensor, and wherein when the object is a human finger, the fingerprint sensor is further configured to form a fingerprint image based on constant voltage values within an entire region of the fingerprint sensor contacted by the finger.

5. The smart watch of claim 1, further comprising a touch sensor provided with the fingerprint sensor and configured to recognize a movement of a user's finger on the fingerprint sensor.

6. The smart watch of claim 1, wherein the control circuitry, when controlling operation of the smart watch based on the quantity of the fingerprints detected by the fingerprint sensor that correspond to the stored fingerprints, is further configured to:

control the smart watch to perform a first operation when only one of the fingerprints detected by the fingerprint sensor corresponds to the stored fingerprints, control the smart watch to perform a second operation that differs from the first operation when two or more of the fingerprints detected by the fingerprint sensor correspond, respectively, to the stored fingerprints, and control the smart watch to not perform the first operation or the second operation when none of the fingerprints detected by the fingerprint sensor correspond to the stored fingerprints.

7. The smart watch of claim 1, wherein first content and the second content are associated with different levels of confidentiality, the second content being associated with a greater level of confidentiality than the first content.

8. A method to control a smart watch, the method comprising:

registering, by the smart watch, a plurality of different fingerprints;

detecting, by the smart watch, one or more fingerprints of a user in connection with initiating an operation;

authenticating, by the smartwatch, the user based on comparing the detected fingerprints and the registered fingerprints, wherein authenticating the user includes identifying a quantity of the detected fingerprints that correspond to the registered fingerprints, and determining that the user is authenticated when at least one of the detected fingerprints corresponds to the registered fingerprints; and when the user is authenticated, performing, by the smart watch, the operation according to the quantity of the detected fingerprints that correspond to the registered fingerprints, wherein performing the operation includes
outputting first content and second content when two or more of the detected fingerprints correspond, respectively, to two or more of the registered fingerprints, and outputting the first content and not the second content when only one of the detected fingerprints corresponds to one of the registered fingerprints, wherein the first content and the second content are not displayed when the user is not authenticated, and wherein performing the operation further includes
outputting a first graphical symbol associated with performing a first operation when one of the fingerprints detected by the fingerprint sensor corresponds to one of the stored fingerprints; and concurrently outputting the first graphical symbol and a second graphical symbol associated with performing a second operation when two or more of the fingerprints detected by the fingerprint sensor correspond, respectively, to two or more of the stored fingerprints.

9. The method of claim 8, wherein the smart watch includes a sensor to detect the fingerprints that is included in a bezel of the smart watch and is configured to simultaneously detect a plurality of fingerprints.

10. The method of claim 8, wherein registering the fingerprints includes:

detecting, by a fingerprint sensor installed in a bezel of the smart watch, fingerprints associated with at least two fingers contacting the bezel; and storing the detected fingerprints in a memory of the smart watch.

11. The method of claim 10, wherein detecting the fingerprints associated with the at least two fingers contacting the bezel includes:

detecting the fingerprints as at least two fingertips of a hand of a person contact the fingerprint sensor and rotate such that the fingertips of the person contact the fingerprint sensor.

12. The method of claim 8, further comprising performing a prescribed operation based on determining at least two different ones of the detected fingerprints correspond to the registered fingerprints.

13. The method of claim 8, further comprising:
detecting a movement of a finger of the user when detecting the fingerprint of the finger; and
performing a predetermined operation based on the detected movement of the finger.

14. The method of claim 8, wherein information designated as confidential is associated with a particular one of the stored fingerprint, and wherein performing the operation includes:
determining, by the smart watch whether one of the detected fingerprints corresponds to the particular stored fingerprint associated with the confidential information; and
outputting, by the smart watch, the confidential information when one of the detected fingerprint corresponds to the particular stored fingerprint.

15. The method of claim 8, wherein the first content and the second content are associated with different levels of confidentiality, the second content being associated with a greater level of confidentiality than the first content.

16. The method of claim 8, wherein performing the operation includes presenting different ranges of operation according to the quantity of the detected fingerprints that correspond to the registered fingerprints.

17. The method of claim 8, further comprising:
when the smart watch is connected to an external device so that communication therebetween is enabled, allowing different ranges of operation and information at the smart watch and the external device according to whether the user is authenticated by at least one of the smart watch or the external device.

18. The method of claim 8, further comprising:
when the smart watch is connected to an external device so that communication therebetween is enabled, and when the user is authenticated by one of the smart watch or the external device, allowing a limited range of information and operation at one or more of the smart watch or the external device for the user.

19. The method of claim 18, further comprising:
when the user is additionally authenticated by another one of the smart watch or the external device, allowing an additional range of information and operation by the one or more of the smart watch or the external device.

\* \* \* \* \*